United States Patent
Sasaki et al.

(10) Patent No.: US 11,110,685 B2
(45) Date of Patent: Sep. 7, 2021

(54) INTEGRALLY MOLDED BODY AND METHOD OF PRODUCING SAME

(71) Applicant: Toray Industries, Inc., Tokyo (JP)

(72) Inventors: Hideaki Sasaki, Nagoya (JP); Yuki Takahashi, Nagoya (JP); Keisuke Shiozaki, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 16/468,198

(22) PCT Filed: Nov. 30, 2017

(86) PCT No.: PCT/JP2017/043037
§ 371 (c)(1),
(2) Date: Jun. 10, 2019

(87) PCT Pub. No.: WO2018/110293
PCT Pub. Date: Jun. 21, 2018

(65) Prior Publication Data
US 2019/0389174 A1 Dec. 26, 2019

(30) Foreign Application Priority Data

Dec. 12, 2016 (JP) .............................. JP2016-240064

(51) Int. Cl.
*B32B 5/26* (2006.01)
*B29C 45/14* (2006.01)
(Continued)

(52) U.S. Cl.
CPC .......... *B32B 5/26* (2013.01); *B29C 45/14508* (2013.01); *B32B 5/02* (2013.01);
(Continued)

(58) Field of Classification Search
CPC .... B32B 5/26; B32B 5/02; B32B 5/18; B32B 5/245; B32B 7/12; B32B 15/14;
(Continued)

(56) References Cited

U.S. PATENT DOCUMENTS

| 5,584,957 A | * | 12/1996 | Schultheis | .............. | B29C 65/76 126/211 |
| 2009/0117366 A1 | * | 5/2009 | Honma | .................. | B32B 27/065 428/314.8 |

FOREIGN PATENT DOCUMENTS

| JP | 11-179758 A | 7/1999 |
| JP | 2000-272014 A | 10/2000 |

(Continued)

OTHER PUBLICATIONS

Translation of JP2016049649A (bib, description and claims). (Year: 2016).*

*Primary Examiner* — Catherine A. Simone
(74) *Attorney, Agent, or Firm* — DLA Piper LLP (US)

(57) ABSTRACT

An integrally molded body has a bonding resin (C) interposed between a board (A) and a member (B), one surface of the board being a design surface, wherein: inside the member (B), a first bonding section disposed to space apart the board (A) and the member (B) and by which at least a partial region of an outer peripheral edge section of the board (A) bonds to the bonding resin (C), is provided; and at least at a part of the design surface-side surface of the integrally molded body, a region where the board (A), the member (B), and the bonding resin (C) are exposed is provided. A plurality of structures can be bonded with high bonding strength and allows for the bonding boundary thereof to have favorable smoothness, thereby making it possible to mitigate warping and reduce weight and thickness even when the molded body has a board constituent member.

13 Claims, 9 Drawing Sheets

(51) Int. Cl.
- *B32B 5/02* (2006.01)
- *B32B 5/18* (2006.01)
- *B32B 5/24* (2006.01)
- *B32B 7/12* (2006.01)
- *B32B 15/14* (2006.01)
- *B32B 15/20* (2006.01)
- *B29K 77/00* (2006.01)
- *B29K 309/08* (2006.01)
- *B29L 31/34* (2006.01)

(52) U.S. Cl.
CPC ................ *B32B 5/18* (2013.01); *B32B 5/245* (2013.01); *B32B 7/12* (2013.01); *B32B 15/14* (2013.01); *B32B 15/20* (2013.01); *B29K 2077/00* (2013.01); *B29K 2309/08* (2013.01); *B29L 2031/3481* (2013.01); *B32B 2260/021* (2013.01); *B32B 2260/046* (2013.01); *B32B 2262/101* (2013.01); *B32B 2262/106* (2013.01); *Y10T 428/24777* (2015.01)

(58) Field of Classification Search
CPC .............. B32B 15/20; B32B 2260/021; B32B 2260/046; B32B 2262/101; B32B 2262/106; B29C 45/14508; B29C 45/14; Y10T 428/24777; B29K 2077/00; B29K 2309/08; B29L 2031/3481
See application file for complete search history.

(56) References Cited

FOREIGN PATENT DOCUMENTS

| | | | |
|---|---|---|---|
| JP | 2003-25837 | A | 1/2003 |
| JP | 2003-236877 | A | 8/2003 |
| JP | 2005-297581 | A | 10/2005 |
| JP | 2008-34823 | A | 2/2008 |
| JP | 2016049649 | A * | 4/2016 |
| JP | 2016-97589 | A | 5/2016 |

* cited by examiner

INTEGRALLY MOLDED BODY AND METHOD OF PRODUCING SAME

TECHNICAL FIELD

This disclosure relates to an integrally molded body suitable for applications requiring lightweight, high strength, high stiffness and small thickness to be used, for example, as parts and casing parts of personal computers, office automation equipment, mobile phones and the like, and a method of producing the same.

BACKGROUND

Currently, as electric and electronic devices such as personal computers, office automation equipment, AV equipment, mobile phones, telephones, facsimile machines, household electric appliances, toy goods and the like are developed to be made portable, it is required to make them smaller in size and lighter in weight. To achieve such requirements, since it is necessary to prevent parts of the equipment, especially the casings, from being greatly bent when a load is externally applied, thereby causing contact with the internal parts or destroying them, thinning is required while achieving high strength and high stiffness.

Further, in a small-sized and lightweight molded structure, which is formed by integrally bonding and molding a fiber reinforced resin structure comprising reinforcing fibers and a resin and another member, for example, a frame member or the like, further thinning without warping and reliability of bonding strength are required.

JP-A-2003-236877 describes "a resin bonded body bonded with a first resin molded article and a second resin molded article by injecting a molten resin into a bonding section formed between the first resin molded article and the second resin molded article", and discloses an effect that "the bonding strength can be effectively secured by a small amount of injection resin regardless of the bonding position" by the configuration that "the bonding section is formed with an opening at the downstream side of the injection flow path as an approximate center and has a portion extending outwardly from the opening center at an angle with respect to the injection direction of the molten resin in the injection flow path."

However, the configuration of JP-A-2003-236877 aims at bonding two resin molded articles with a simple device with a small amount of injection resin, there is room for improvement in application to the formation of a molded body formed by bonding a plurality of members to each other, aiming to realize a reduction in thickness and weight and suppress warping and, further, there is also no suggestion on such a constitution.

Further, JP-A-HEI-11-179758 describes "a synthetic resin hollow molded article obtained by integrating a plurality of divided pieces formed by injection molding a synthetic resin via a bonding section to form a primary hollow molded article, and fusing the bonding section at a secondary molded part formed by attaching this primary hollow molded article to a mold for molding and further injection molding the synthetic resin", and discloses an effect that "there is no resin leakage to the hollow portion side in the bonding section, and the breaking strength of the bonding section is excellent" by the configuration that "the bonding section is formed by forcible fitting."

However, the configuration of JP-A-HEI-11-179758 mainly aims that, by forming the bonding section to be difficult to come out mutually by forcible fitting, even if the molding pressure of the secondary injection molding is increased and the fitting portion of the bonding section is deformed, the leakage of resin from the gap, being caused, to the hollow portion side of the molded article can be prevented and, therefore, there is room for improvement in application to the formation of a molded body formed by bonding a plurality of members to each other, aiming also to realize reduction in thickness and weight and suppress warping and, further, there is also no suggestion on such a constitution.

Further, JP-A-2000-272014 describes "a configuration in which a passage is formed in a bonding section of a plurality of resin parts, and by filling the passage with a bonding resin, the plurality of resin parts are bonded by the bonding resin", and further discloses an effect that "the bonding resin can be prevented from running off to outside from the passage, and further, a resin product hardly causing cracks, breakage and bonding deficiency can be formed without deteriorating the appearance of the resin product" by the configuration of "providing projected portions to at least one resin part."

However, the configuration of JP-A-2000-272014 mainly aims to prevent cracks, breakage cracks and bonding deficiency, and further to prevent the bonding resin from running off and, therefore, there is room for improvement in application to the formation of a molded body formed by bonding a plurality of members to each other, aiming also to realize reduction in thickness and weight and suppress warping and, further, there is also no suggestion on such a constitution.

Furthermore, JP-A-2008-34823 discloses "an integrally molded body made of a material comprising a fiber reinforced thermoplastic resin wherein a thermoplastic resin adhesive layer comprising a thermoplastic resin nonwoven fabric and the like is provided on a bonding interface between a radio wave shielding material (a) and a radio wave transmitting material (b) and the radio wave shielding material (a) and the radio wave transmitting material (b) are fixedly bonded to each other via the thermoplastic resin adhesive layer by outsert injection molding", and discloses an effect that "an electronic device casing excellent in peeling strength of the bonding section and mass productivity can be obtained without deteriorating the wireless communication performance while maintaining the radio shielding property."

However, in the configuration of JP-A-2008-34823, since the radio wave transmitting material is molded by a method of injecting the material forming it into a mold in which the radio wave shielding material is placed, the amount of injected resin increases and when the integrally molded body is a board having a plane shape, there is room for improvement with respect to reduction of warping due to thermal shrinkage of the resin.

It could therefore be helpful to provide an integrally molded body wherein a plurality of structures are bonded with a high bonding strength, the bonding boundary has a good smoothness, warping can be mitigated even when the molded body has a board constituent member, and it enables to make it light in weight and thin in thickness, and a method of producing the same.

SUMMARY

We thus provide:

(1) An integrally molded body in which a bonding resin (C) is interposed between a board (A) whose one surface is a design surface and a member (B), wherein: inside the member (B), a first bonding section, which is disposed to space apart the board (A) and the member (B) and by which at least a partial region of an outer peripheral edge section of the board (A) bonds to the bonding resin (C), is provided; and at least at a part of the design surface-side surface of the integrally molded body, a region where the board (A), the member (B), and the bonding resin (C) are exposed is provided.

(2) The integrally molded body according to (1), wherein the first bonding section is formed over the entire circumference of the outer peripheral edge section of the board (A).

(3) The integrally molded body according to (1) or (2), wherein the board (A) and the member (B) include a region overlapping via the bonding resin (C).

(4) The integrally molded body according to any one of (1) to (3), wherein the bonding resin (C) is a thermoplastic resin.

(5) The integrally molded body according to any one of (1) to (4), wherein the member (B) is a metal frame.

(6) The integrally molded body according to any one of (1) to (4), wherein the member (B) is a fiber reinforced resin comprising reinforcing fibers and a resin.

(7) The integrally molded body according to any one of (1) to (6), wherein the member (B) is a frame member having a standing wall shape portion in at least a part of the member (B).

(8) The integrally molded body according to any one of (1) to (7), wherein the board (A) has a member composed of at least one of a fiber reinforced resin member comprising reinforcing fibers and a thermosetting resin and a metal member.

(9) The integrally molded body according to (8), wherein the board (A) has a sandwich structure sandwiching both surfaces of a core layer with skin layers each of which includes the member composed of at least one of a fiber reinforced resin member comprising reinforcing fibers and a thermosetting resin and a metal member, and the core layer is selected from a thermoplastic resin, a foam, and a porous base material comprising discontinuous fibers and a thermoplastic resin.

(10) The integrally molded body according to (8) or (9), wherein a thermoplastic resin layer (D) is further provided on the outer surface of the board (A), and the board (A) and the bonding resin (C) are bonded via the thermoplastic resin layer (D).

(11) The integrally molded body according to (9) or (10), wherein a fitting portion, into which the bonding resin (C) enters, is provided in a part of the core layer composed of either the foam or the porous base material comprising discontinuous fibers and a thermoplastic resin.

(12) The integrally molded body according to (9) or (10), wherein a stepped portion is provided between the first bonding section and a region other than the first bonding section of the board (A) whose core layer is the porous base material, and the stepped portion has an inclined surface of 10° to 90° with respect to the in-plane direction of the board (A).

(13) The integrally molded body according to (12), wherein the porosity of the porous base material in the first bonding section is lower than the porosity of the porous base material in the region other than the first bonding section.

(14) A method of producing an integrally molded body having at least the following steps [1] and [2].

[1] a step of placing a board (A), whose one surface is a design surface, inside a member (B) having a frame shape, at a condition where at least a part of the board (A) is apart from the member (B)

[2] a step of bonding and integrating the board (A) and the member (B) with each other at least at an outer peripheral edge section of the board (A) by injection molding a bonding resin (C) into a space between the board (A) and the member (B)

(15) The method of producing an integrally molded body according to (14), wherein at least a part of the surface of the integrally molded body on the design surface side is formed as a region where the board (A), the member (B), and the bonding resin (C) are exposed, by injection molding the bonding resin (C) into the space from the opposite side of the design surface.

According to the integrally molded body and the production method thereof, a plurality of structures are bonded with a high bonding strength, the bonding boundary has a good smoothness, warping can be mitigated even when the molded body has a board constituent member, and making it light in weight and thin in thickness can be realized.

EXPLANATION OF SYMBOLS

Figure 1:
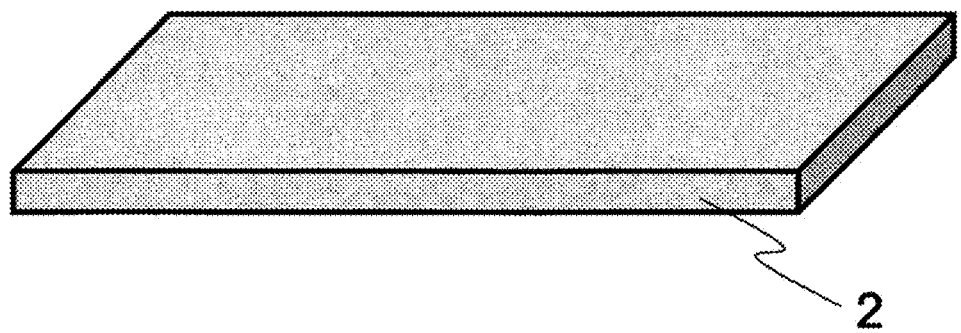
FIG. 1 is a perspective view showing an example of a board (A) which is a constituent member of an integrally molded body.

1: integrally molded body
2: board (A)
3: member (B)
4: bonding resin (C)
5: outer peripheral edge section
6: bonding boundary
7: overlapping region
8: standing wall part
9: thermoplastic resin layer (D)
10: skin layer
11: core layer
12: first bonding section
13: region other than first bonding section
14: stepped part
15: lower mold
16: upper mold
17: fitting part

DETAILED DESCRIPTION

Hereinafter, examples will be explained with reference to the drawings. Where, this disclosure is not limited to the drawings and examples at all.

An integrally molded body has a structure wherein, in the integrally molded body in which a bonding resin (C) is interposed between a board (A) whose one surface is a design surface and a member (B), inside the member (B), a first bonding section disposed to space apart the board (A) and the member (B) and by which at least a partial region of an outer peripheral edge section of the board (A) bonds to the bonding resin (C), is provided, and at least at a part of the design surface-side surface of the integrally molded body, a region where the board (A), the member (B), and the bonding resin (C) are exposed is provided.

Figure 2:
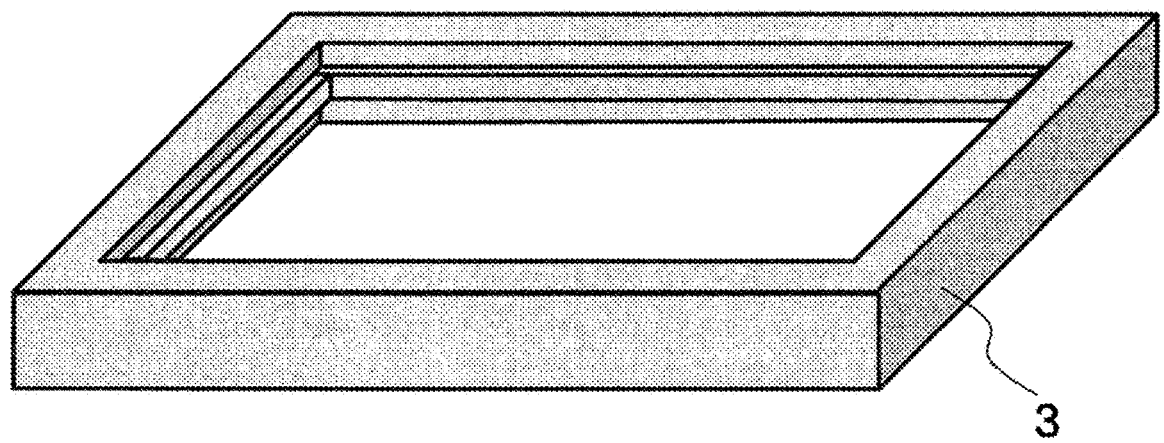
FIG. 2 is a perspective view showing an example of a member (B) which is a constituent member of the integrally molded body.
Figure 3:
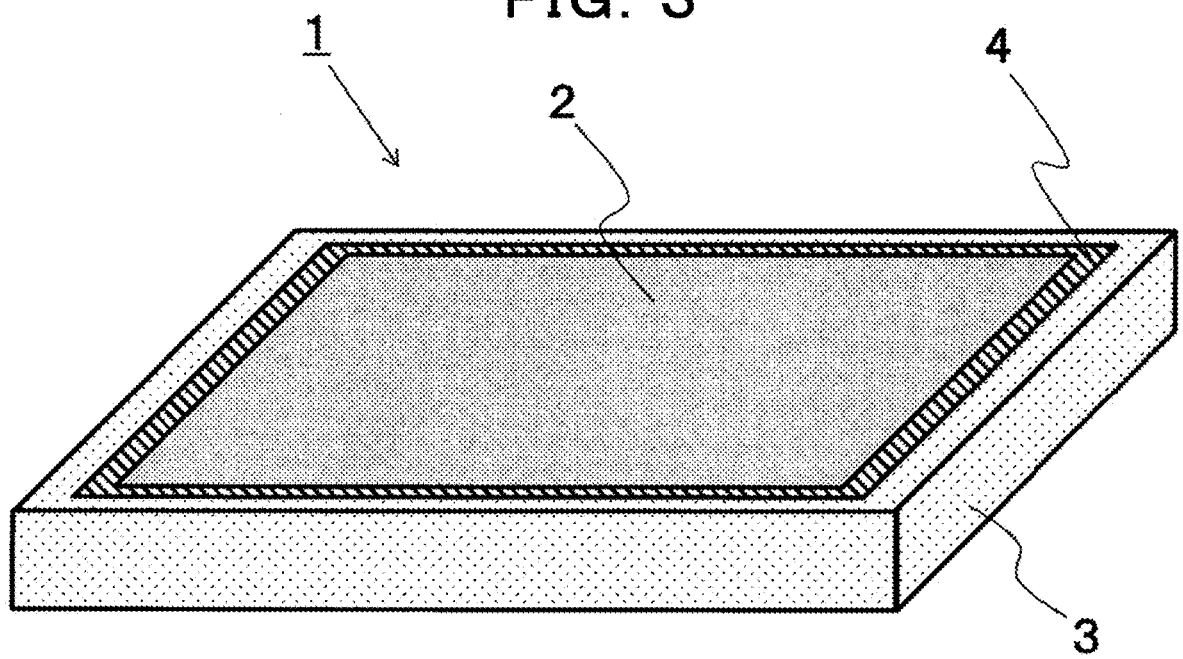
FIG. 3 is a perspective view showing an example of the integrally molded body.
Figure 4:
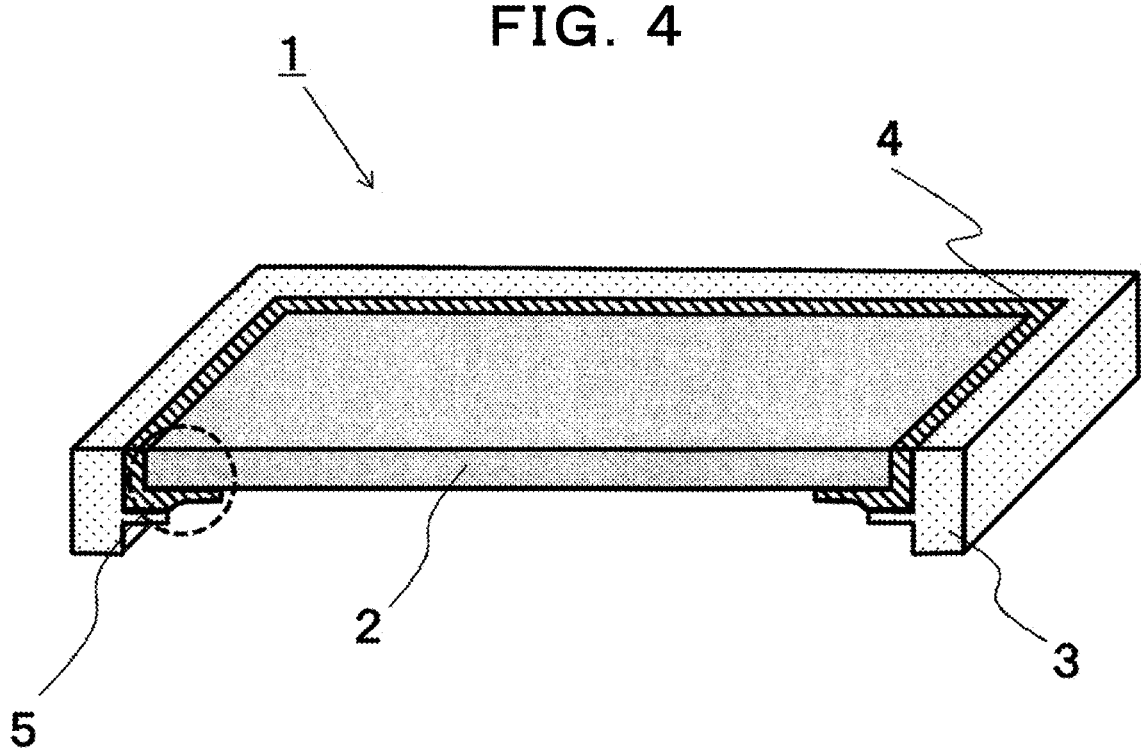
FIG. 4 is a perspective view showing an example of a cross section in the thickness direction of an integrally molded body.
Figure 5:
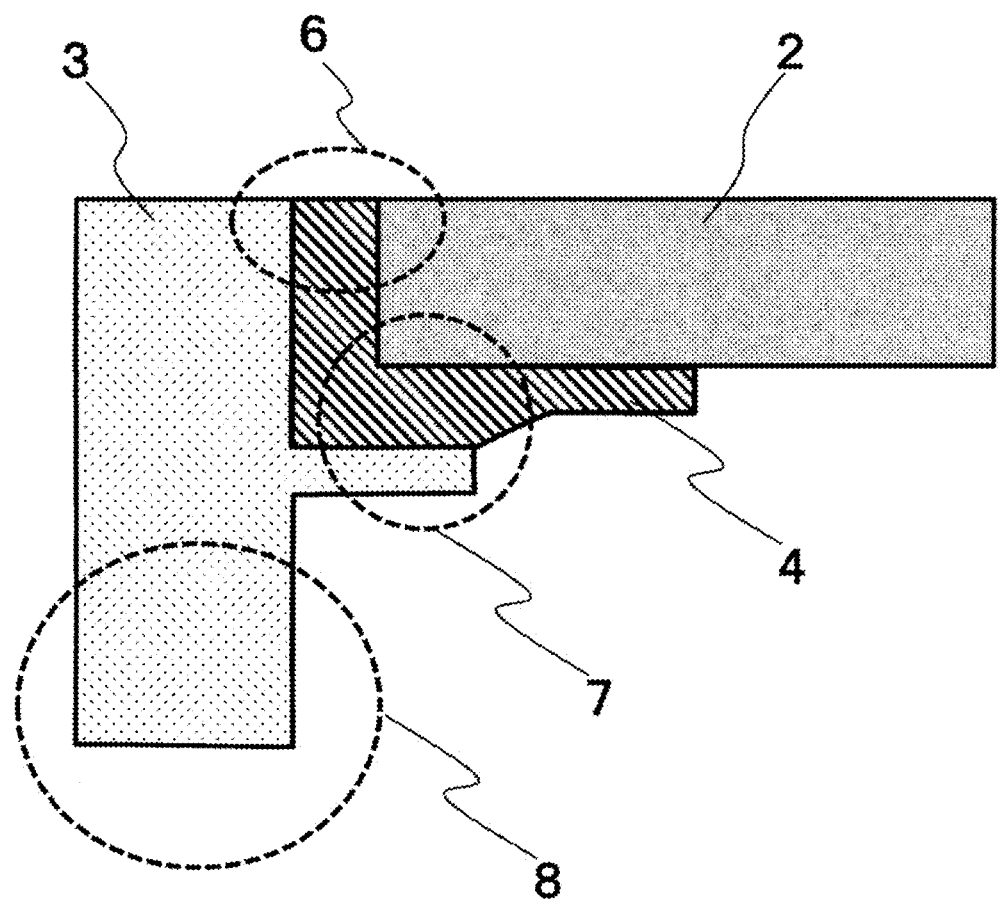
FIG. 5 is an enlarged cross-sectional view showing an example of a bonding state in the vicinity of an outer peripheral edge section of the integrally molded body.

As shown in FIGS. 1 to 3, the integrally molded body 1 has a configuration wherein the board (A) 2 and the member (B) 3 are separately prepared in advance and both are bonded by the bonding resin (C) 4. For example, as shown in FIGS. 3 to 5, a bonding resin (C) 4 is bonded to a side surface portion and a flat surface portion of the outer peripheral edge section 5 of the board (A) 2 (referred to as a first bonding section), and further, the bonding resin (C) 4 and the member (B) 3 are bonded (referred to as a second bonding section), and the bonding resin (C) 4 is interposed therebetween.

By this configuration, the bonding strength can be secured even if the amount of the bonding resin is reduced, and further, the resin amount can be greatly reduced as compared to the conventional molding method wherein the bonding resin (C) is injected also into the region of the member (B) and integrated with the board (A), and it becomes possible to intend to mitigate the warping due to the thermal shrinkage of the resin.

Further, the board (A) 2 is placed inside the member (B) 3 at a state apart therefrom. As shown in FIG. 5 which is an enlargement of the outer peripheral edge section 5 of the integrally molded body 1, the board (A) 2 is placed inside the member (B) 3, for example, the board (A) 2 and the member (B) do not have a portion in contact with each other, and are disposed in a form facing each other at a state where the bonding resin (C) 4 is interposed therebetween. By this, the injected bonding resin (C) 4 is easily inserted between the board (A) 2 and the member (B) 3, it becomes possible to enhance the bonding strength of the integrally molded body 1 with a small amount of bonding resin, and further it becomes possible to mitigate the warping due to the thermal shrinkage of the resin by reducing the amount of the bonding resin.

The bonding resin (C) 4, and the board (A) 2 and the member (B) 3 are bonded and integrated by injection molding the bonding resin (C) 4 between the board (A) 2 and the member (B) 3, and interposing the bonding resin (C) 4 therebetween. This will be described later.

Further, the board (A) 2 and the bonding resin (C) 4 are bonded at the outer peripheral edge section 5 of the board (A) 2. The outer peripheral edge section 5 of the board (A) 2 has a length preferably of 0.1 to 15% from the edge of the board with respect to the length of one side of the board (A) 2. It is more preferably 0.5 to 10%, further preferably 1 to 5%. If it is less than 0.1%, the bonding strength may decrease, whereas if it exceeds 15%, the amount of the resin may increase and the warping at molding may deteriorate.

Further, it is preferred that the board (A) 2 has a planar shape in which the area of the side surface portion is smaller than the bottom area, the bottom area is 50 to 10,000 cm$^2$, and the thickness of the board (A) 2, which is the height of the side surface portion, is 2 to 20 mm. More preferably, the bottom area is 100 to 2,500 cm$^2$, the board thickness is 0.4 to 10 mm, and further preferably, the bottom area is 300 to 1,000 cm$^2$, and the board thickness is 0.6 to 2 mm. For example, in a so-called thin-type rectangular parallelepiped shape having an area of the side surface portion smaller than the bottom area such as a casing of a personal computer because the area of the side surface portion is narrow, and to bond the member (B) 3 to that portion, a large bonding strength is required. Even in such a formation, by employing the bonding configuration, it is possible to bond the member (B) 3 with a strong strength even in a bonding section with a small area.

Further, it is configured to have a region where the board (A) 2, the member (B) 3, and the bonding resin (C) 4 are exposed on at least a part of the surface of the integrally molded body 1 on the design surface side.

In the conventional formation of bonding using an adhesive, when the adhesive seeps out, the adhesive having seeped must be removed and, further, a very high dimensional accuracy is required for positioning between the members to be bonded.

On the other hand, in our molded bodies and methods, as shown in FIG. 5, by the molding in which the bonding resin (C) 4 is interposed between the board (A) 2 and the member (B) 3 to be bonded, and the bonding resin (C) 4 is to be exposed between the members, as long as a certain dimensional accuracy is secured, the bonding between the board (A) 2 and the member (B) 3 by the bonding resin (C) 4 can be easily performed. In FIG. 5, the upper side is the design surface side. Further, at the time of molding, the board (A) 2, the bonding resin (C) 4 and the member (B) 3 are arranged on the design surface of the mold in a flush manner, thereby improving the smoothness of the bonding boundary 6.

Further, it is preferred that the aforementioned first bonding section is formed over the entire circumference of the outer peripheral edge section 5 of the board (A) 2. As shown in FIG. 3 or 4, the bonding section is formed over the entire circumference of the outer peripheral edge section of the board (A) 2 and bonded to the bonding resin (C) 4, whereby high bonding strength and thinning can be realized as a whole of the integrally molded body 1.

Still further, it is preferred that the board (A) 2 and the member (B) 3 have a configuration including a region 7 (FIG. 5) that overlaps via the bonding resin (C) 4. As shown in FIG. 5, the overlapping region 7 is formed by disposing the member (B) 3 to overlap in parallel under the board (A) 2 via the bonding resin (C) 4, whereby it is possible to improve the bonding strength of the integrally molded body 1.

Yet further, it is preferred that the bonding resin (C) 4 is a thermoplastic resin. By this, it is possible to easily insert the bonding resin (C) 4 between the board (A) 2 and the member (B) 3 by injection molding and to improve the bonding strength of the integrally molded body 1.

Further, a metal frame can be suitably used as the member (B) 3. Even when a metal frame is used as the member (B) 3, the bonding resin (C) 4, by being molten, can be bonded to the surface of the member (B) 3 which is a metal frame.

As the metal frame, can be used various metal plates such as various steel plates such as a hot rolled steel plate, a stainless steel plate (SUS), a single layer plated steel plate obtained by plating a metal such as nickel, zinc, copper or the like as a single layer, a plural-layers plated steel plate obtained by plating a plurality of layers of two or more of these metals and the like, and various metal plates such as an aluminum plate and an aluminum alloy plate. The surface of the metal plate may be subjected to an electrolytic treatment in a dichromic acid solution for forming a single layer film composed of hydrated chromium oxide, an electrolytic chromic acid treatment for forming a two-layered film in which the upper layer is formed of hydrated chromium and the lower layer is formed of metallic chromium, and various chemical treatments such as immersion chromic acid treatment, chromic acid treatment with phosphoric acid, etching treatment with alkaline solution or acid solution, and anodizing treatment. Further, to enhance the adhesion to the bonding resin (C) 4, in addition to the method of etching the surface of the metal plate with the chemical solution as described above, a method of forming fine unevenness on the metal surface by a method such as laser processing or sandpaper and achieving bonding by anchoring due to resin ingress can be preferably used.

Further, various primers and adhesives can also be interposed on the surface of the metal plate for the purpose of improving the adhesion between the metal plate and the bonding resin (C) 4. As the primers and adhesives, can be exemplified conventionally known coupling agents such as aluminum-based, titanium-based, silane-based coupling agents, acrylic resin based adhesives, urethane resin based adhesives, epoxy resin based adhesives, polyester resin based adhesives and the like.

Further, a fiber reinforced resin composed of reinforcing fibers and a resin can be suitably used as member (B) 3.

When the member (B) 3 is a fiber reinforced resin containing a thermosetting resin, it becomes a structure bonded to the bonding resin (C) 4.

Further, when the member (B) 3 is a fiber reinforced resin containing a thermoplastic resin, it becomes a bonding structure where the thermoplastic resin of the member (B) 3 is molten and fixed to the bonding resin (C) 4. By this, a higher bonding strength can be realized as the integrally molded body 1. The bonding structure due to being molten and fixed means a bonding structure at a state where the mutual members are molten by heat and are cooled and fixed to each other.

Still further, it is preferred that the member (B) 3 is a frame member having a standing wall shape portion in at least a part of the member (B) 3. For example, as shown in FIG. 5, the integrally molded body 1 can be formed into a box shaped body by having a standing wall shape portion 8 extending downward of the member (B) 3.

Yet further, a member composed of at least one of a fiber reinforced resin member comprising reinforcing fibers and a thermosetting resin and a metal member can be suitably used as the board (A) 2.

The bonding resin (C) is molten and bonded to the surface of the board (A) 2 composed of at least one of a fiber reinforced resin member comprising reinforcing fibers and a thermosetting resin and a metal member. For the purpose of improving the characteristics such as weight reduction and high stiffness of the board (A) or the purpose of improving the bonding strength between the board (A) and the bonding resin (C), another member can be added to the board (A). As a metal member of this another member, the same material and surface treatment method as those of the metal frame of member (B) 3 aforementioned can be used.

Further, it is preferred that the board (A) has a sandwich structure sandwiching both surfaces of a core layer with skin layers each of which includes the member composed of at least one of a fiber reinforced resin member comprising reinforcing fibers and a thermosetting resin and a metal member, and the core layer is selected from a thermoplastic resin, a foam, and a porous base material comprising discontinuous fibers and a thermoplastic resin.

Figure 6:
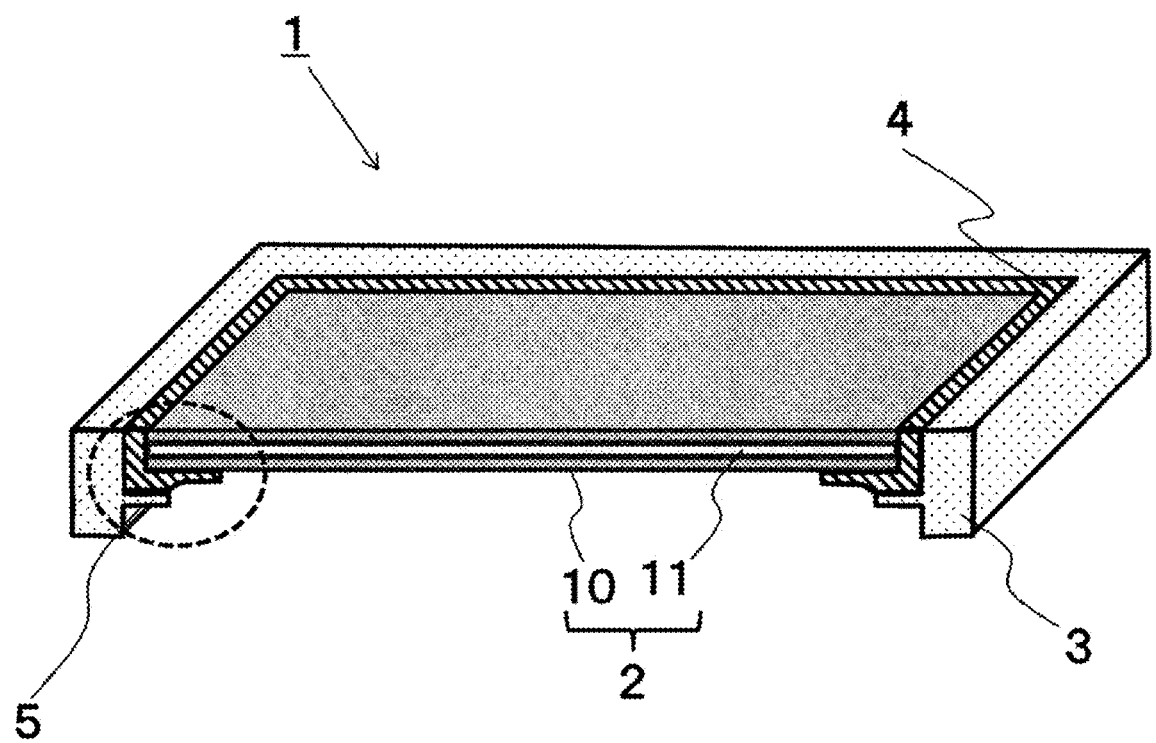
FIG. 6 is a perspective view showing an example of a cross section in the thickness direction of an integrally molded body when a board (A) is a sandwich structure composed of a skin layer and a core layer.
Figure 7:
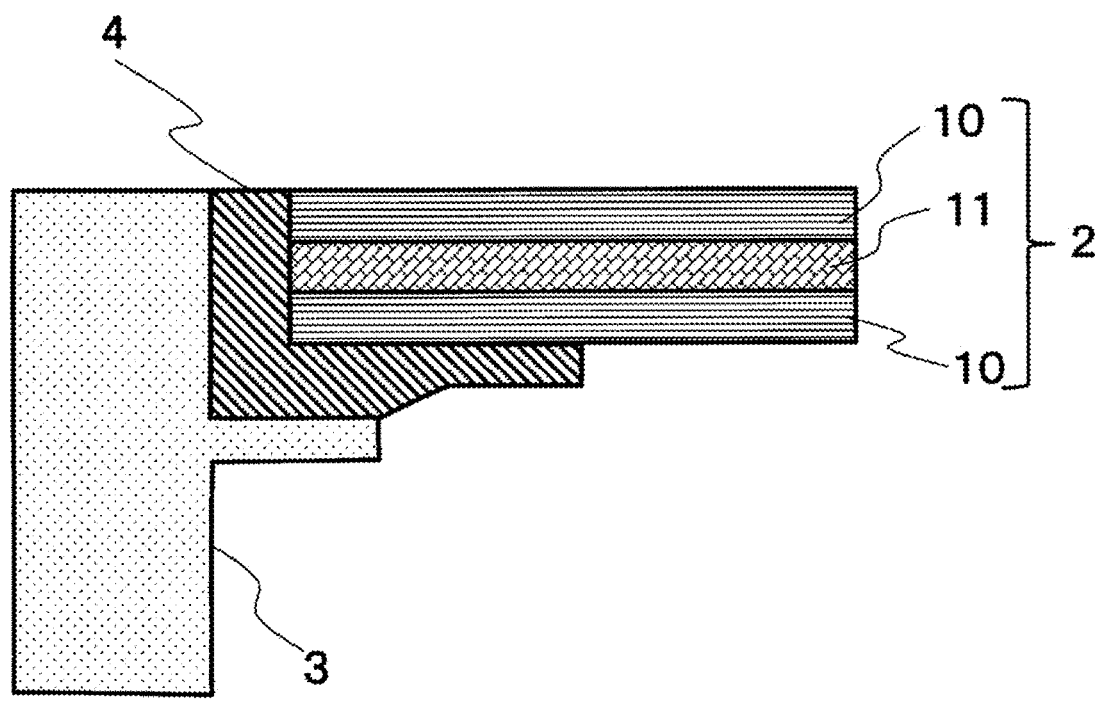
FIG. 7 is an enlarged cross-sectional view showing a bonding state in the vicinity of the outer peripheral edge section of the integrally molded body shown in FIG. 6.

For example, as shown in FIGS. 6 and 7, by the configuration where a core layer 11 comprising a thermoplastic resin or a foam is sandwiched with skin layers 10 each of which includes the member composed of at least one of a fiber reinforced resin member comprising reinforcing fibers and a thermosetting resin and a metal member, it is possible to realize reduction in weight and high stiffness of the board (A) 2.

Further, it is also possible to use a porous base material formed by heating a core layer precursor composed of discontinuous fibers and a thermoplastic resin, thereby forming a space in the thickness direction by expanding by spring back, as the core layer 11. After heating the molded body containing the discontinuous fibers and the thermoplastic resin constituting the core layer 11 at a temperature higher than the softening point or melting point of the thermoplastic resin and pressurizing it, the pressurization is released, and by expanding it by the restoring force to return to the original style when the residual stress of the discontinuous fibers is released, so-called spring back, a desired space can be formed in the core layer 11. By this, it is possible to realize weight reduction and high stiffness of the integrally molded body 1.

As the foam having pores used for the core layer 11, polyurethane resins, phenol resins, melamine resins, acrylic resins, polyethylene resins, polypropylene resins, polyvinyl chloride resins, polystyrene resins, acrylonitrile-butadiene-styrene (ABS) resins, polyetherimide resins or a polymethacrylic imide resins can be suitably used. Concretely, to ensure the lightweight property, it is preferred to use a resin having an apparent density smaller than that of the skin layer, and in particular, a polyurethane resin, an acrylic resin, a polyethylene resin, a polypropylene resin, a polyetherimide resin or a polymethacrylic imide resin can be preferably used.

Further, an example is also preferred wherein a thermoplastic resin layer (D) is further provided on the outer surface of the board (A), and the board (A) and the bonding resin (C) are bonded via the thermoplastic resin layer (D).

Figure 8:
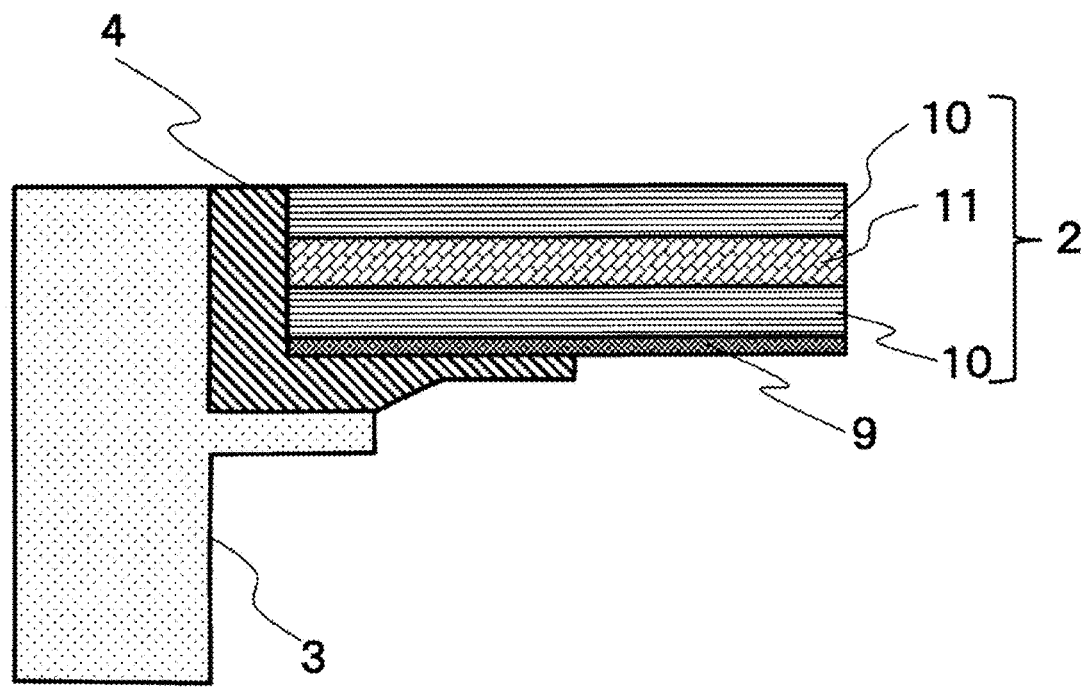
FIG. 8 is a sectional view showing an example of a bonding state in the vicinity of an outer peripheral edge section of an integrally molded body in which a thermoplastic resin layer (D) is provided on one surface of a board (A).

For example, as shown in FIG. 8, a thermoplastic resin layer (D) 9 is previously adhered to the surface of the board (A) 2 to be bonded to the bonding resin (C) 4, and thereafter, the bonding resin (C) 4 is injection molded. By this, the board (A) 2 is bonded to the molten bonding resin (C) 4 via the thermoplastic resin layer (D) 9, thereby realizing a high bonding strength as an integrally molded body. As the thermoplastic resin layer (D) 9, a thermoplastic resin film or a thermoplastic resin nonwoven fabric can be appropriately used.

Further, it is preferred that a fitting portion, into which the bonding resin (C) 4 enters, is provided in a part of the core layer 11 composed of either the foam or the porous base material comprising discontinuous fibers and a thermoplastic resin.

Figure 9:
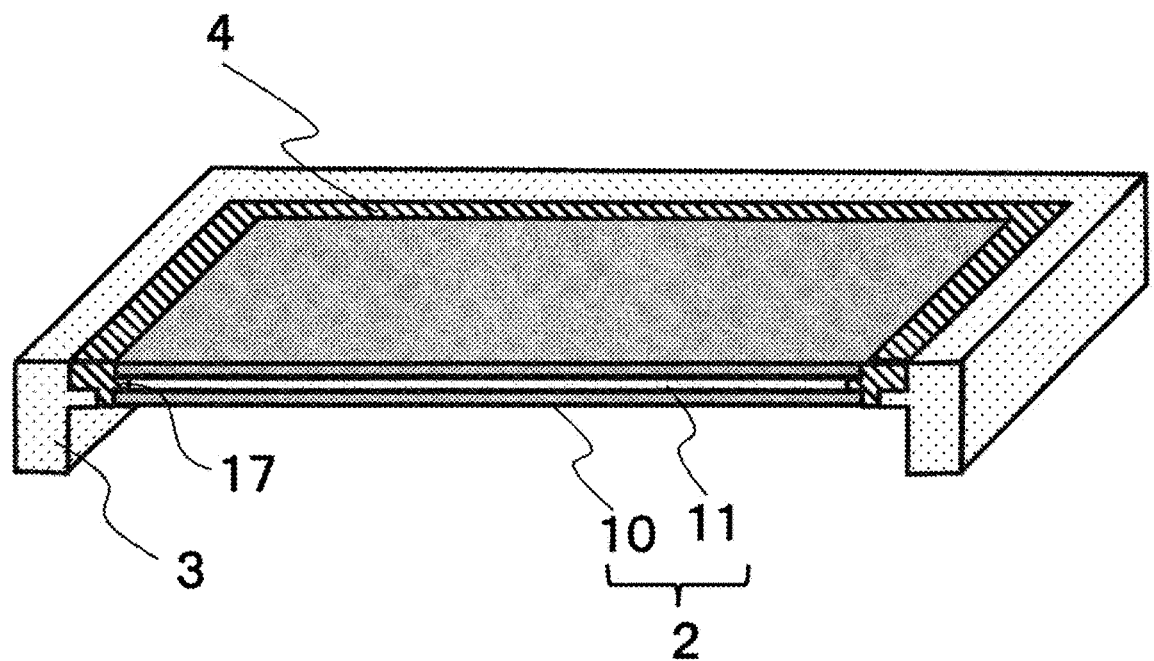
FIG. 9 is a perspective view showing an example of a cross section in the thickness direction of an integrally molded body when a board (A) is a sandwich structure composed of a skin layer and a core layer comprising a foam.
Figure 10:
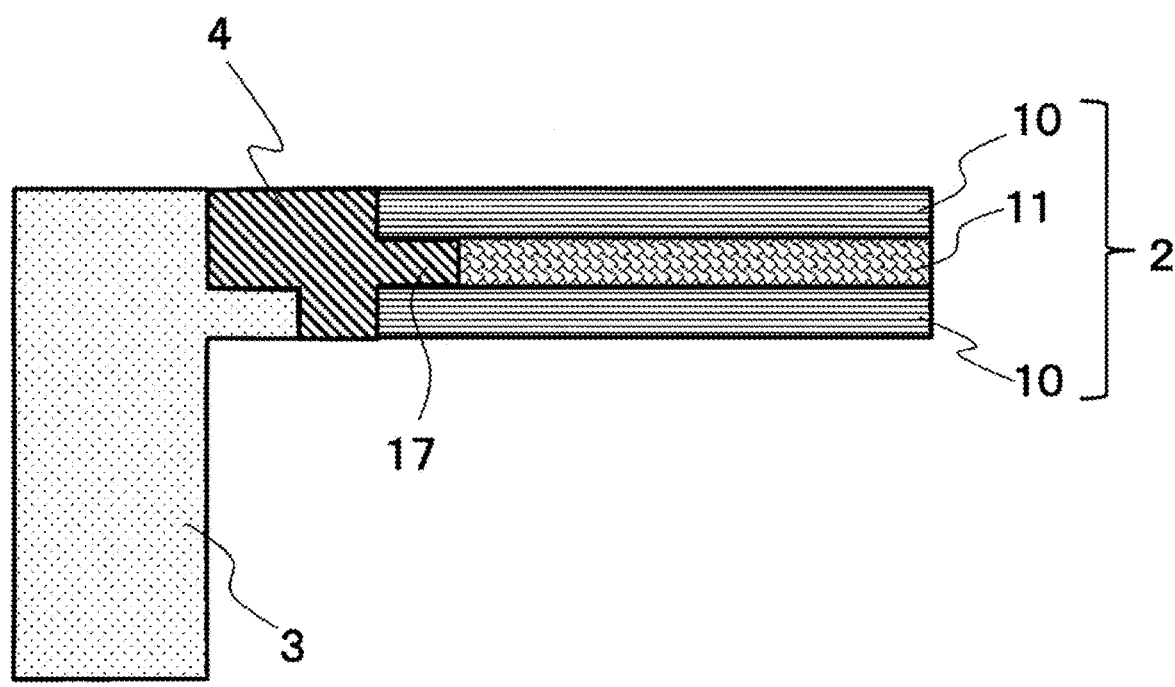
FIG. 10 is an enlarged sectional view showing a bonding state in the vicinity of the outer peripheral edge section of the integrally molded body shown in FIG. 9.

For example, as shown in FIGS. 9 and 10, when the bonding resin (C) 4 is injection molded, the bonding resin (C) 4 and the flat surface portion or the side surface portion of the skin layer 10 of the board (A) 2 are bonded, and the bonding resin (C) 4 enters into a partial region within the core layer 11 from the side surface of the board (A) 2 by the injection molding pressure. This is because the region in the core layer 11 has a high porosity and it has a structure into which the molten bonding resin (C) 4 enters easily. Further, by using the porous base material composed of discontinuous fibers and a thermoplastic resin as the core layer 11, the bonding strength can be further enhanced by anchoring effect caused with the bonding resin (C) 4 entering inside the core layer 11.

Figure 11:
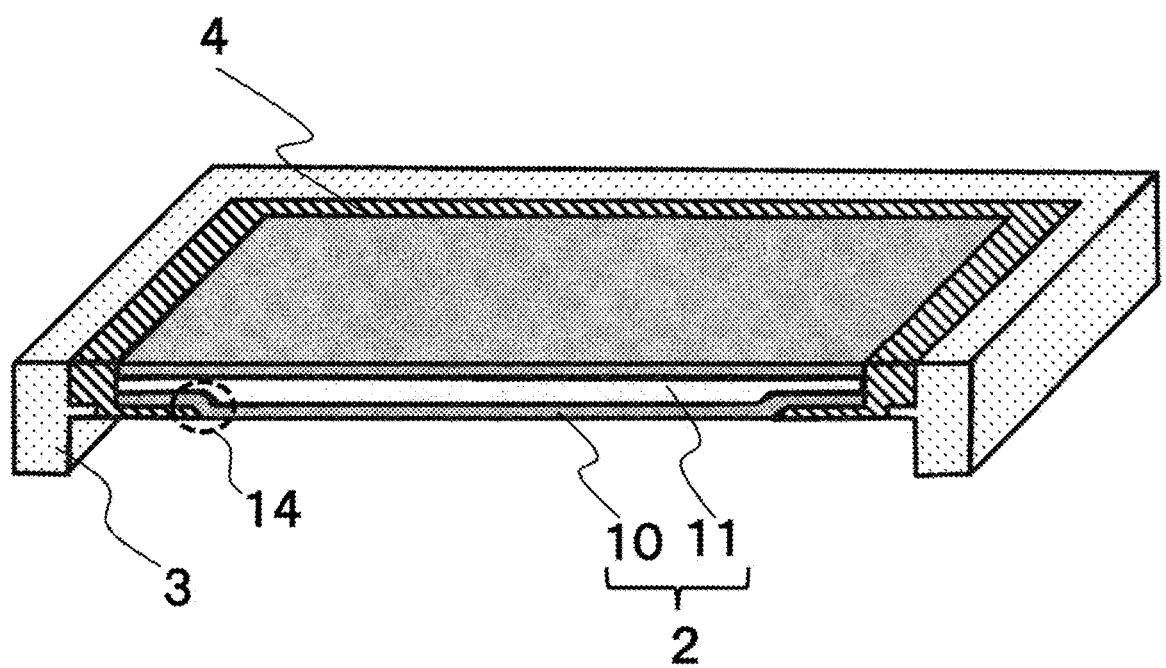
FIG. 11 is a perspective view showing an example of a cross section in the thickness direction of an integrally molded body when a board (A) is a sandwich structure having a stepped portion.
Figure 12:
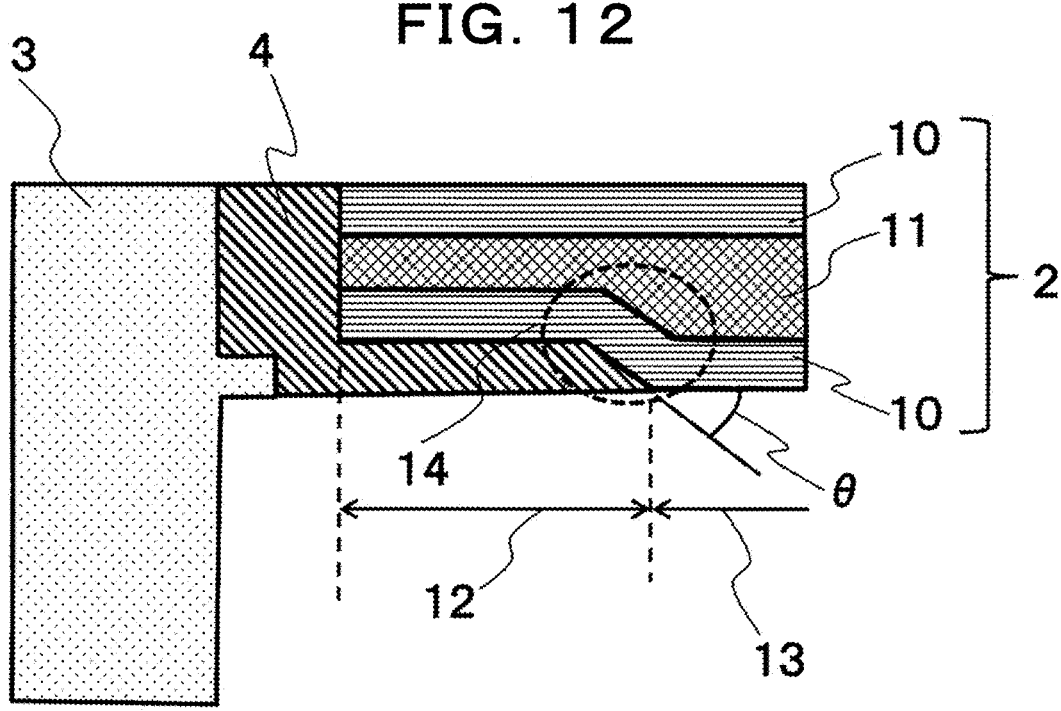
FIG. 12 is an enlarged cross-sectional view showing a bonding state in the vicinity of the outer peripheral edge section of the integrally molded body shown in FIG. 11.

Further, for example, as shown in FIGS. 11 and 12, it is also preferred that a stepped portion 14 is provided between a first bonding section 12 and a region 13 other than the first bonding section of the board (A) 2 whose core layer 11 is the porous base material, and the stepped portion 14 has an inclined surface with angle 0 of 10° to 90° with respect to the in-plane direction of the board (A) 2.

It is formed as a configuration wherein in the first bonding section 12 present in the outer peripheral edge section of the board (A) 2, a region having a different thickness which is approximately horizontal to the in-plane direction of the main body part is provided, and the stepped portion 14 is formed by providing an inclination of the angle θ to the lower-side skin layer 10. By this, the bonding area of the first bonding section 12 is increased, the bonding area can be widened as compared to when another structure is merely bonded to the side flat portion of the sandwich structure, and the effect of enhancing the bonding strength can be obtained. Furthermore, the thickness of the board (A) 2 and the thickness of the bonding resin (C) 4 can be made the same thickness, and it can be realized to reduce the thickness of the structure together with achieving a high bonding strength.

The inclination angle θ (°) of the skin layer 10 with respect to the in-plane direction of the board (A) 2 is preferably 10 to 90°, more preferably 30 to 90°, further preferably 45 to 90°. The angle θ at the vertically stepped portion is 90°.

Further, it is preferred that the porosity of the porous base material in the first bonding section 12 is preferably lower than the porosity of the porous base material in the region 13 other than the first bonding section.

For example, as shown in FIG. 11 and the sectional view of FIG. 12, the core layer 11 is composed of discontinuous fibers and a thermoplastic resin, and pores with a certain size are formed in the core layer 11. The board (A) 2 which is a sandwich structure comprises the first bonding section 12 formed on at least a part of the outer peripheral edge section and the region 13 other than the first bonding section, and the porosity of the core layer 11 in the region 13 other than the first bonding section and the porosity of the core layer 11 in the first bonding section 12 are different from each other.

The kinds of the thermoplastic resins constituting the board (A) 2, the member (B) 3 and the bonding resin (C) 4 are not particularly limited, and any kind of resin of the thermoplastic resins exemplified as follows can be used. For example, can be exemplified polyester resins such as polyethylene terephthalate (PET) resin, polybutylene terephthalate (PBT) resin, polytrimethylene terephthalate (PTT) resin, polyethylene naphthalate (PEN) resin and liquid crystal polyester resins, polyolefin resins such as polyethylene (PE) resin, polypropylene (PP) resin and polybutylene resin, polyoxymethylene (POM) resin, polyamide (PA) resin, polyarylene sulfide resin such as polyphenylene sulfide (PPS) resin, polyketone (PK) resin, polyether ketone (PEK) resin, polyether ether ketone (PEEK) resin, polyether ketone ketone (PEKK) resin, polyether nitrile (PEN) resin, fluorine-based resin such as polytetrafluoroethylene resin, crystalline resin such as liquid crystal polymer (LCP), styrene-based resin, other than those, polycarbonate (PC) resin, polymethyl methacrylate (PMMA) resin, polyvinyl chloride (PVC) resin, polyphenylene ether (PPE) resin, polyimide (PI) resin, polyamideimide (PAI) resin, polyetherimide (PEI) resin, polysulfone (PSU) resin, polyethersulfone resin, amorphous resins such as polyarylate (PAR) resin, and as others, phenolic-based resins, phenoxy resins, further, polystyrene-based resins, polyolefin-based resins, polyurethane-based resins, polyester-based resins, polyamide-based resins, polybutadiene-based resins, polyisoprene-based resins, fluorine-based resins, and thermoplastic elastomers such as acrylonitrile-based resin, and thermoplastic resins selected from copolymers and modified products and the like thereof. Among them, a polyolefin resin is preferable from the viewpoint of light weight of the obtained molded article, and a polyamide resin is preferable from the viewpoint of strength, and from the viewpoint of surface appearance, a polycarbonate resin, a styrene-based resin and an amorphous resin such as a modified polyphenylene ether-based resin are preferred, a polyarylene sulfide resin is preferable from the viewpoint of heat resistance, and a polyether ether ketone resin is preferably used from the viewpoint of continuously used temperature.

Further, as the reinforcing fibers, can be exemplified insulating fibers such as polyacrylonitrile (PAN) based, rayon based, lignin based, pitch type carbon fibers, graphite fibers and glass fibers, organic fibers such as aramid resin, polyphenylene sulfide resin, polyester resin, acrylic resin, nylon resin and polyethylene resin, and inorganic fibers such as silicon carbide and silicon nitride. One type of these reinforcing fibers may be used alone, or two or more types may be used in combination. Among them, carbon fibers such as PAN based, pitch type and rayon based excellent in specific strength and specific stiffness are preferably used from the viewpoint of weight reduction effect. Further, from the viewpoint of enhancing the economic efficiency of the molded article to be obtained, glass fibers are preferably used, and in particular, it is preferred to use carbon fibers and glass fibers in combination from the viewpoint of balance between mechanical properties and economic efficiency. Further, aramid fibers are preferably used from the viewpoint of enhancing impact absorption and shaping property of the molded article to be obtained and, in particular, it is preferred to use carbon fibers and aramid fibers in combination from the viewpoint of balance between mechanical properties and impact absorption. Furthermore, from the viewpoint of increasing the conductivity of the molded article to be obtained, it is also possible to use a reinforcing fiber coated with a metal such as nickel, copper or ytterbium. Among these, PAN-based carbon fibers excellent in mechanical properties such as strength and elastic modulus can be used more preferably.

Further, as examples of the thermosetting resin, thermosetting resins such as unsaturated polyester resin, vinyl ester resin, epoxy resin, phenolic (resol type) resin, urea-melamine resin, polyimide resin, maleimide resin and benzoxazine resin can be preferably used. A resin blended with two or more of these may be applied. Among them, in particular, epoxy resin is preferable from the viewpoint of the mechanical properties and heat resistance of the molded body. The epoxy resin is preferably contained as a main component of the resin to be used to exhibit its excellent mechanical properties, and concretely, it is preferably contained at an amount of 60% by weight or more per resin composition.

Next, a method of producing an integrally molded body will be explained with reference to the drawings.

We provide a method of producing an integrally molded body having at least the following steps [1] and [2].

[1] a step of placing a board (A) 2, whose one surface is a design surface, inside a member (B) 3 having a frame shape, at a condition where at least a part of the board (A) 2 is apart from the member (B) 3

[2] a step of bonding and integrating the board (A) 2 and the member (B) 3 with each other at least at an outer peripheral edge section of the board (A) 2 by injection molding a bonding resin (C) 4 into a space between the board (A) 2 and the member (B) 3

An example of the production method will be explained with reference to FIGS. 13A and 13B.

First, the board (A) 2 shown in FIG. 1 and the member (B) 3 having a rectangular frame shape shown in FIG. 2 are separately formed in advance.

Figure 13A:
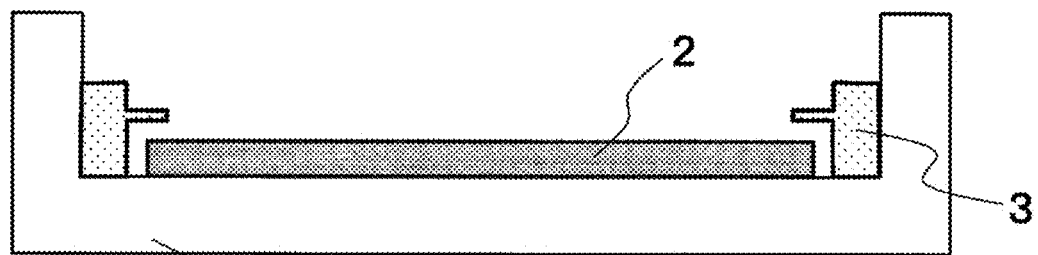
FIGS. 13A and 13B are schematic diagrams showing an example of a method of producing an integrally molded body.

As shown in FIG. 13A, they are disposed at a state where the board (A) 2 is positioned inside the member (B) 3 at a condition where at least a part of the board (A) 2 is apart from the member (B) 3 and the design surface side of the board (A) 2 is set to a lower mold 15 side.

Figure 13B:
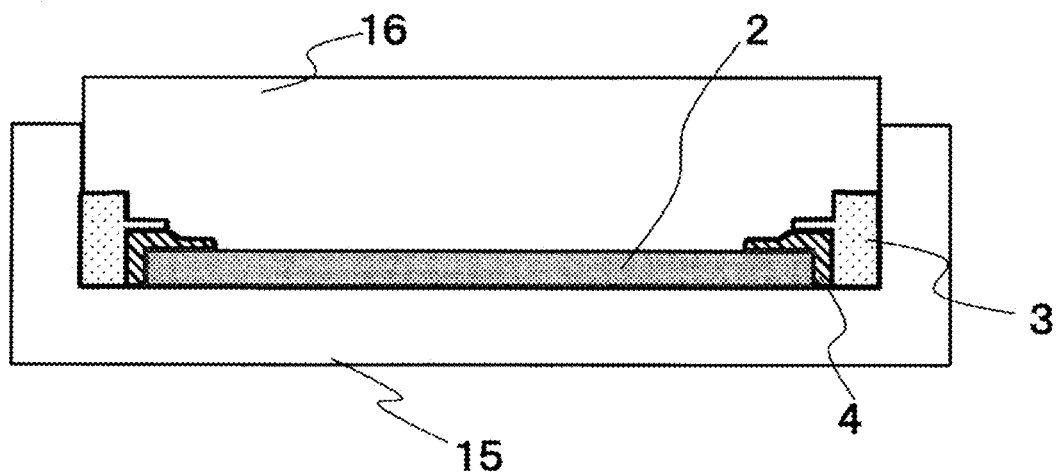

Thereafter, as shown in FIG. 13B, an upper mold 16 is set, and the molten bonding resin (C) 4 is injection molded in the space portion formed between the board (A) 2 and the member (B) 3. By this, the bonding resin (C) 4 interposed is bonded and integrated with the member (B) 3 at the outer peripheral edge section of the board (A) 2. Insert injection molding and outsert injection molding are preferably used.

Further, in the production method, it is preferred that, by injection molding the bonding resin (C) 4 into the space from the opposite side to the design surface, at least a part of the surface of the integrally molded body 1 on the design surface side is formed as a region in which the board (A) 2, the member (B) 3 and the bonding resin (C) 4 are exposed.

As shown in FIG. 13B, the board (A) 2 and the member (B) 3 are disposed on the lower mold 15 at a state where their surfaces are flush with each other, and by injection molding the molten bonding resin (C) 4 into the space formed between the board (A) 2 and the member (B) 3, the surfaces of the 3 members are exposed at a flush condition on the bottom surface of the mold, thereby improving the surface design in the bonding section of the integrally molded body.

Further, an example using a member (B) 3 having another form will be explained with reference to FIGS. 14 and 15.

Figure 14:
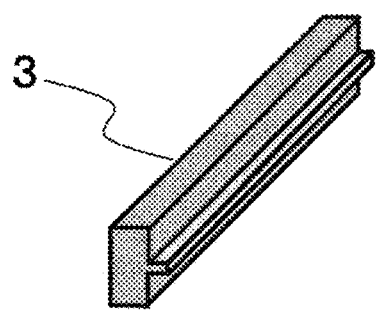
FIG. 14 is a perspective view showing an example of another configuration of a member (B) which is a constituent member of an integrally molded body.
Figure 15:
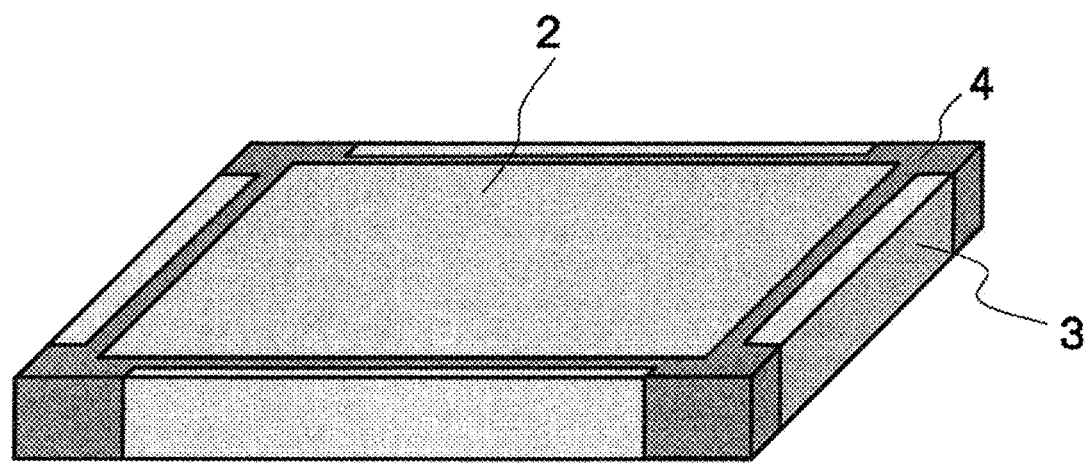
FIG. 15 is a perspective view showing an example of another configuration of an integrally molded body.

FIG. 14 shows one part of a member (B) 3 having a form that is independent of the four sides. As shown in FIG. 15, the member (B) 3 is disposed on the outside of the four sides of a board (A) 2 with a certain space therebetween, and then the bonding resin (C) 4 is injection molded to bond and integrate the board (A) 2 and the member (B) 3, which is independent of the four sides, at a condition where the bonding resin (C) 4 is interposed therebetween.

By making the member (B) 3 into a form independent of the four sides, the degree of freedom of molding of the integrally molded body can be expanded, and by disposing the bonding strength (C) 4 at the four corner positions, the bonding strength can be increased.

EXAMPLES

Hereinafter, the integrally molded body and the method of producing the same will be concretely explained by examples, but the following examples do not limit this disclosure. First, the measurement methods used in the examples will be described below.

(1) Warping Amount of Integrally Molded Body

The displacement (mm) in the thickness direction of the top board (board (A)) was measured as follows at a condition where the design surface side of the integrally molded body with a box shape was set to face upward. Measurement points are the central part of the top board (board (A)), the four corners of the integrally molded body, and the central part of each long side and short side (total: 9 points). Where, measurement points other than the center part of the top board (board (A)) were 2 mm inside from each long side and short side respectively, and a three-dimensional measuring instrument was used for the measurement.

The warping amounts of the long side and the short side were derived from the displacements (mm) of the remaining 8 points not including the displacement (mm) of the central part of the top board (board (A)). In the measurement of the warping amount of the long side, first, among three displacements (mm) obtained from one long side, a distance between the straight line connecting the two end points and the central point was determined. Next, similarly, the distance between the straight line connecting the two end points and the central point obtained from the other long side was determined, and the average value of the distances calculated from the two long sides was defined as the warping amount of the long side. In the same way, the warping amount of the short side was derived.

The warping amount of the diagonal was derived from the displacement (mm) of the central part and the displacements (mm) of the four corners of the top board (board (A)). Similarly to the method of deriving the warping amount of the long side, the distance between the straight line connecting the two corners of the integrally molded body and the point of the central part of the top board (board (A)) was determined with respect to each of the two diagonal lines, and the average value of these distances was defined as the warping amount of the diagonal.

Further, the sum of the respective obtained warping amounts was evaluated based on the following criteria. A and B are determined to be acceptable, and C and D are determined to be not acceptable.

A: The sum of warping amounts is less than 2.5 mm
B: The sum of warping amounts is 2.5 mm or more and less than 3.0 mm
C: The sum of warping amounts is 3.0 mm or more and less than 3.5 mm
D: The sum of warping amounts is 3.5 mm or more (2) Smoothness of Bonding Boundary Line of Integrally Molded Body In the bonding section of the integrated molded body, using a surface roughness meter, the measuring head of the surface roughness meter was scanned across the bonding section perpendicularly to the bonding boundary line and the surface roughness of the integrally molded body was measured (measurement method was based on JIS B 0633 (2001)). A roughness curve was obtained from the displacement in the thickness direction of the board (A) (in the Y direction, unit: μm) and the measurement stroke (unit: mm). As the measurement conditions, the measurement stroke was 20 mm, the measurement speed was 0.3 mm/s, the cutoff value was 0.3 mm, the filter type was Gaussian, and no inclination correction was selected. The bonding section was set at a position of 10 mm which was the midpoint of the measurement stroke. The difference between the Y direction displacement of the maximum peak top and the Y direction displacement of the minimum valley bottom in the obtained roughness curve was defined as a step of the bonding section. In this example, Surfcom 480 A supplied by Tokyo Seimitsu Co., Ltd. was used as the surface roughness meter. By the above-described method, the steps of the respective bonding sections between the board (A) and the bonding resin (C), between the board (A) and the member (B), and between the member (B) and the bonding resin (C), were determined. Each measurement was performed at each central part of two long sides of the integrally molded body, and the average value thereof was defined as the step of the bonding section.

The obtained step of the bonding section was evaluated according to the following criteria. Further, based on the evaluation result with the step of each bonding section, comprehensive evaluation was performed based on the following criteria. In both instances, A and B are determined to be acceptable, and C is determined to be not acceptable.

Determination criteria with respect to step of each bonding section

A: The step of bonding section is less than 8.0 μm.
B: The step of bonding section is 8.0 μm or more and less than 1.2 μm.
C: The step of bonding section is 1.2 μm or more.

Determination criteria for comprehensive evaluation with respect to step of bonding section A: When all are determined as A
B: When determination C is not included and at least one is determination B
C: When at least one is determination C (3) Comprehensive evaluation of integrally molded body Based on the determination results in the two comprehensive evaluations of the warping amount of the integrally molded body and the smoothness of the bonding boundary line of the integrally molded body, the comprehensive evaluation of the integrally molded body was performed according to the following criteria. A and B are determined to be acceptable, and C and D are determined to be not acceptable.

A: When both of the two comprehensive evaluations are determination A
B: When among the two comprehensive evaluations, determinations C and D are not included and at least one is determination B
C: When among the two comprehensive evaluations, determination D is not included and at least one is determination C
D: When among the two comprehensive evaluations, at least one is determination D Material Composition Example 1

Preparation of PAN-Based Carbon Fiber Bundle

Spinning and burning treatment were carried out from a polymer containing polyacrylonitrile as a main component to obtain a continuous bundle of carbon fibers having a total filament number of 12,000. A sizing agent was applied to this continuous carbon fiber bundle by a dipping method and dried in heated air to obtain a PAN-based carbon fiber bundle. The properties of this PAN-based carbon fiber bundle were as follows.

Diameter of single fiber: 7 μm
Mass per unit length: 0.83 g/m
Density: 1.8 g/cm$^3$
Tensile strength: 4.0 GPa
Tensile modulus of elasticity: 235 GPa Material Composition Example 2

Preparation of Epoxy Resin Film

An epoxy resin (base resin: dicyandiamide/dichlorophenylmethylurea-cured type epoxy resin) was coated on a release paper using a knife coater to obtain an epoxy resin film.

Material Composition Example 3

Preparation of Unidirectional Prepreg

The PAN-based carbon fiber bundles obtained in Material Composition Example 1 were arranged in one direction in a sheet form, two epoxy resin films prepared in Material Composition Example 2 were stacked from both surface sides of the carbon fiber sheet, the resin was impregnated by heating and pressurizing to prepare a unidirectional prepreg having a weight content of carbon fibers of 70% and a thickness of 0.15 mm.

Material Composition Example 4

Preparation of Thermoplastic Adhesive Film

Pellets of a polyamide resin (CM 8000 supplied by Toray Industries, Inc., a four-component copolymerized polyamide 6/66/610/12, melting point: 130° C.) were press molded to obtain a thermoplastic adhesive film having a thickness of 0.05 mm. This was used as the thermoplastic resin layer (D).

Material Composition Example 5 Glass fiber reinforced nylon resin

Glass fiber reinforced nylon resin CM1011G-30 (supplied by Toray Industries, Inc., nylon 6 resin matrix, fiber weight content: 30%, melting point: 225° C.) was used as the bonding resin (C).

Material Composition Example 6

Foamed Polypropylene Resin Sheet

Polypropylene resin-based foamed sheet, thickness: 0.65 mm, density: 0.5 g/cm$^3$ Material Composition Example 7

Chopped Carbon Fiber Bundle

Using a cartridge cutter, the PAN-based carbon fiber bundle of Material Composition Example 1 was cut to obtain a chopped carbon fiber bundle having a fiber length of 6 mm.

Material Composition Example 8

Preparation of Carbon Fiber Mat 100 liters of a 1.5 wt % aqueous solution of a surfactant ("n-dodecylbenzene sulfonate sodium" (product name) supplied by Wako Pure Chemical Industries, Ltd.) was stirred to prepare a whipped dispersion. The chopped carbon fiber bundle 1 obtained in Material Composition Example 7 was charged into this dispersion, and stirred for 10 minutes and, thereafter, it was poured into a papermaking machine having a paper making surface with a length of 400 mm×a width of 400 mm, after dehydrating by suction, dried at a temperature of 150° C. for 2 hours to obtain a carbon fiber mat comprising carbon fibers. The obtained mat was in a satisfactorily dispersed state.

Material Composition Example 9

Preparation of Polypropylene Resin Film

90% by mass of an unmodified polypropylene resin ("PRIME POLYPRO" (registered trademark) J105G, supplied by Prime Polymer Co., Ltd., melting point: 160° C.), and 10% by mass of an acid-modified polypropylene resin ("ADMER" (registered trademark) QE510, supplied by Mitsui Chemicals Inc., melting point: 160° C.) were prepared, and they were dry blended. This dry blended product was charged from a hopper of a twin-screw extruder, and after being melt-kneaded by the extruder, it was extruded from a T-shaped die having a width of 400 mm. Thereafter, it was cooled and solidified by being drawn out by a chill roll at 60° C. to obtain a polypropylene resin film.

Material Composition Example 10

Preparation of Polypropylene Resin Sheet

80% by mass of a non-modified polypropylene resin ("PRIME POLYPRO" (registered trademark) J105G, supplied by Prime Polymer Co., Ltd., melting point: 160° C.), and 20% by mass of an acid-modified polypropylene resin ("ADMER" (registered trademark) QE510, supplied by Mitsui Chemicals Inc., melting point: 160° C.) were prepared, and they were dry blended. This dry blended product was charged from a hopper of a twin-screw extruder, and after being melt-kneaded by the extruder, it was extruded from a T-shaped die having a width of 400 mm. Thereafter, it was cooled and solidified by being drawn out by a chill roll at 60° C. to obtain a polypropylene resin film.

Material Composition Example 11

Aluminum Plate

An aluminum plate (AL 5052, thickness: 1.25 mm) was used as a metal member of the board (A).

Material Composition Example 12

CFRP (Carbon Fiber Reinforced Plastic) Frame Material

Using an extruder, a CFRP frame material having the shape shown in FIG. 14, in which a phenolic resin was impregnated into the PAN-based carbon fiber bundle of Material Composition Example 1, was obtained. This was used as a CFRP frame member of the member (B).

Material Composition Example 13

Aluminum Frame Material

The square material of AL 5052 was subjected to CNC processing to obtain an aluminum frame having the shape shown in FIG. 14. This was used as an aluminum frame member of the member (B).

Example 1

Using the unidirectional prepreg obtained in Material Composition Example 3 and the thermoplastic adhesive film obtained in Material Composition Example 4, after each of them was adjusted to a size of 400 mm square, they were laminated in the order of (Unidirectional prepreg 0°/unidirectional prepreg 90°/unidirectional prepreg 0°/unidirectional prepreg 90°/unidirectional prepreg 90°/unidirectional prepreg 0°/unidirectional prepreg 90°/unidirectional prepreg 0°/adhesive film). This laminate was sandwiched with release films and further sandwiched between tool plates. As a thickness adjustment, a spacer having a thickness of 1.25 mm was inserted between the tool plates. After placing a tool plate on a board surface with a board surface temperature of 150° C., the board surface was closed and heated and pressed at 3 MPa. After 5 minutes passed from the pressing, the board surface was opened to obtain a thermosetting CFRP board with a thermoplastic adhesive film having a flat plate shape with a thickness of 1.25 mm. This was designated as a board (A) 2 to which the thermoplastic resin layer (D) adhered.

Next, injection molding was performed using the glass fiber reinforced nylon resin of Material Composition Example 5 to obtain a frame member having a rectangular frame shape shown in FIG. 2. This was designated as a member (B) 3.

Figure 16:
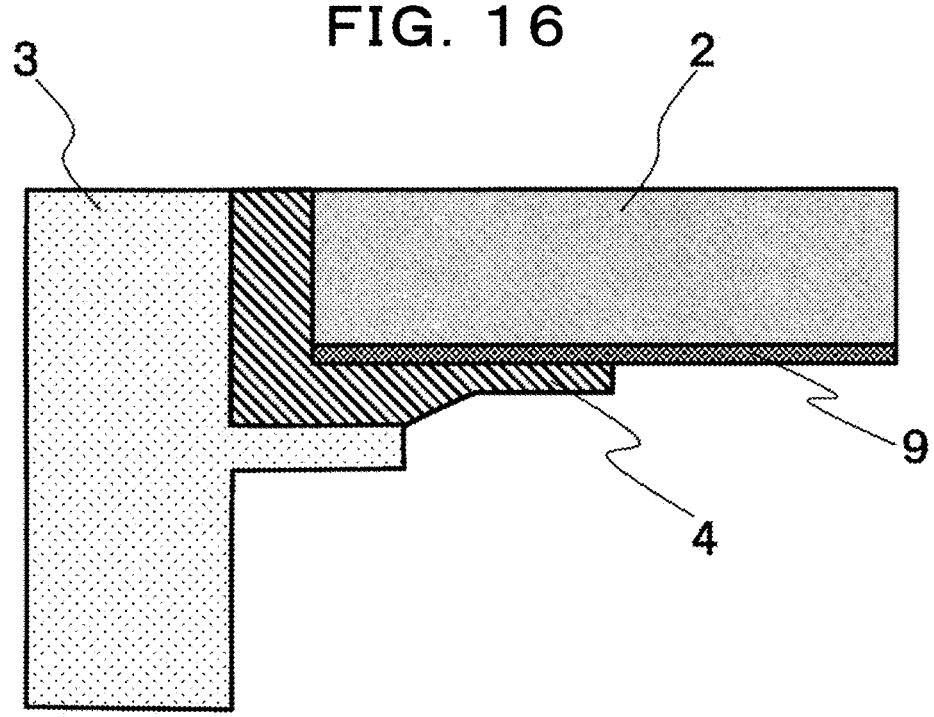
FIG. 16 is a sectional view showing an example of a bonding state in the vicinity of an outer peripheral edge section of an integrally molded body in which a thermoplastic resin layer (D) is provided on one surface of a board (A).

Next, as shown in FIGS. 13A and 13B, inside the frame member (member (B) 3), at a state where being apart from the frame member (member (B) 3), a CFRP board (board (A) 2) attached with a thermoplastic adhesive film processed into a size of 300 mm×200 mm was placed at a state where it was positioned and its design surface side was set to the lower mold 15 side. After setting the upper mold 16, mold clamping was performed, and then, the glass fiber reinforced nylon resin (bonding resin (C) 4) of Material Composition Example 5 was injection molded to manufacture the integrally molded body 1 composed of the top board (board (A) 2) and the standing wall of the four sides (member (B) 3) shown in FIG. 3. The cross section including the bonding section and the standing wall of the obtained integrally molded body 1 is shown in FIG. 16. In FIGS. 3 and 16, the upper side of the figure is shown as the design surface side.

In the design surface of the integrally molded body, any of the bonding boundaries between the CFRP board (board (A) 2) with the thermoplastic adhesive film and the bonding resin (C) 4 and between the bonding resin (C) 4 and the frame member (member (B) 3) of the integrally molded body had a good smoothness. Further, the warping amount of the integrally molded body was small and good. The properties of the integrally molded body are summarized in Table 1.

Example 2

Figure 17:
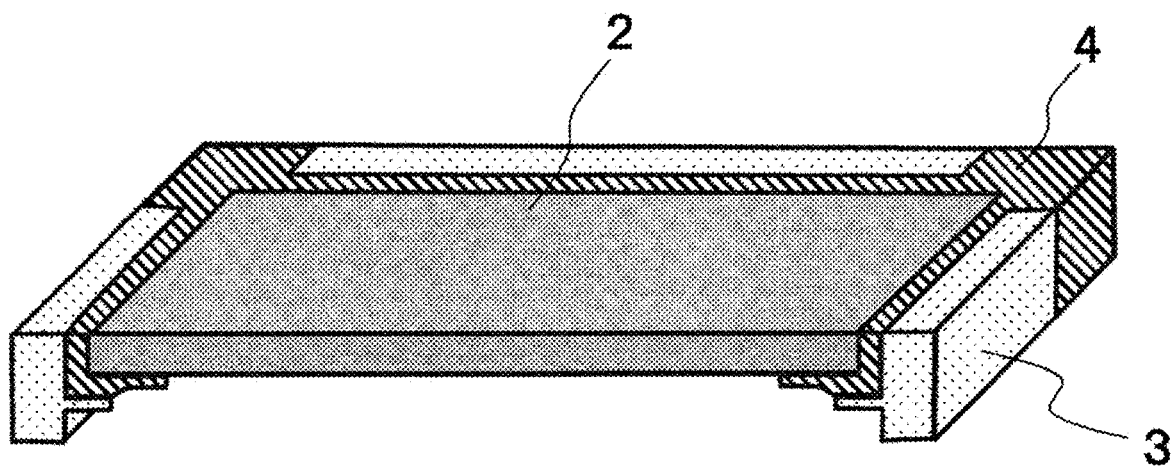
FIG. 17 is a perspective view showing an example of a cross section in the thickness direction of an example of another configuration of an integrally molded body.

The CFRP board (board (A) 2) with the thermoplastic adhesive film having a size of 300 mm×200 mm and a thickness of 1.25 mm obtained in Example 1 and the CFRP frame (member (B) 3) of Material Composition Example 12 shown in FIG. 14 were used. The illustration of the thermoplastic adhesive film was omitted. The surface of the adhesion region of the CFRP frame was roughened with a sandpaper. Next, as shown in FIGS. 13A and 13B, the CFRP board (board (A) 2) with the thermoplastic adhesive film was placed on the central part of the lower mold 15 at a state where the design surface side faces downward, and four CFRP frames (member (B) 3) were arranged on the outside of the CFRP board (board (A) 2) with the thermoplastic adhesive film with a certain space therebetween, respectively, and after closing the mold, the glass fiber reinforced nylon resin of Material Composition Example 5 (bonding resin (C) 4) was injection molded to manufacture the integrally molded body 1 consisting of the top plate and the standing wall of four sides as shown in FIG. 15. The cross section including the bonding section and the standing wall of the obtained integrally molded body 1 is shown in FIG. 17. In FIGS. 15 and 17, the upper side of the figure is shown as the design surface side.

In the design surface of the integrally molded body, any of the bonding boundaries between the CFRP board (board (A) 2) with the thermoplastic adhesive film and the bonding resin (C) 4 and between the bonding resin (C) 4 and the CFRP frame (member (B)) of the integrally molded body had good smoothness. Further, the warping amount of the integrally molded body was small and good.

Example 3

Using the unidirectional prepreg obtained in Material Composition Example 3 and the foamed polypropylene resin sheet obtained in Material Composition Example 6, after each of them was adjusted to a size of 400 mm square, they were laminated in an order of (unidirectional prepreg 0°/unidirectional prepreg 90°/foamed polypropylene resin sheet/ unidirectional prepreg 90°/unidirectional prepreg)0°. This laminate was sandwiched with release films and further sandwiched between tool plates. As a thickness adjustment, a spacer having a thickness of 1.25 mm was inserted between the tool plates. After placing a tool plate on a board surface with a board surface temperature of 150° C., the board surface was closed and heated and pressed at 3 MPa. After 5 minutes passed from the pressing, the board surface was opened to obtain a foamed core layer sandwich structure (board (A) 2) having a flat plate shape with a thickness of 1.25 mm.

Next, a frame member (member (B) 3) having a rectangular frame shape made of the glass fiber reinforced nylon resin obtained in Example 1 and a foamed core layer sandwich structure processed into a size of 300 mm×200 mm were set in a mold for injection molding similarly in Example 1, and after closing the mold, the glass fiber reinforced nylon resin (bonding resin (C) 4) of Material Composition Example 5 was injected to manufacture an integrally molded body composed of the top plate and the standing wall of the four sides shown in FIG. 3. The cross section including the bonding section and the standing wall of the obtained integrally molded body is shown in FIGS. 9 and 10. In FIGS. 3, 9 and 10, the upper side of the figure is shown as the design surface side.

In the design surface of the integrally molded body, any of the bonding boundaries between the foam core layer sandwich structure (board (A) 2) and the bonding resin (C) 4 and between the bonding resin (C) 4 and the frame member (member (B) 3) of the integrally molded body had a good smoothness. Further, the warping amount of the integrally molded body was small and good.

Example 4

Using the unidirectional prepreg obtained in Material Composition Example 3, the thermoplastic adhesive film obtained in Material Composition Example 4, and the polypropylene resin sheet obtained in Material Composition Example 10, after each of them was adjusted to a size of 400 mm square, they were laminated in an order of (unidirectional prepreg 0°/unidirectional prepreg 90°/polypropylene resin sheet/unidirectional prepreg 90°/unidirectional prepreg 0°/adhesive film). This laminate was sandwiched with release films and further sandwiched between tool plates. As a thickness adjustment, a spacer having a thickness of 1.25 mm was inserted between the tool plates. After placing a tool plate on a board surface with a board surface temperature of 160° C., the board surface was closed and heated and pressed at 3 MPa. After 5 minutes passed from the pressing, the board surface was opened to obtain a polypropylene resin core layer sandwich structure (board (A) 2) having a flat plate shape with a thickness of 1.25 mm.

Next, the frame member (member (B) 3) having a rectangular frame shape made of the glass fiber reinforced nylon resin obtained in Example 1 and a polypropylene resin core layer sandwich structure processed into a size of 300 mm×200 mm were set in a mold for injection molding similarly in Example 1, and after closing the mold, the glass fiber reinforced nylon resin (bonding resin (C) 4) of Material Composition Example 5 was injected to manufacture an integrally molded body composed of the top plate and the standing wall of the four sides shown in FIG. 3. The cross section including the bonding section and the standing wall of the obtained integrally molded body is shown in FIG. 8. In FIGS. 3, 9 and 8, the upper side of the figure is shown as the design surface side.

In the design surface of the integrally molded body, any of the bonding boundaries between the polypropylene resin core layer sandwich structure (board (A) 2) and the bonding resin (C) 4 and between the bonding resin (C) 4 and the frame member (member (B) 3) of the integrally molded body had a good smoothness. Further, the warping amount of the integrally molded body was small and good.

Example 5

The unidirectional prepreg of Material Composition Example 3, the thermoplastic adhesive film of Material Composition Example 4, the carbon fiber mat of Material Composition Example 8 and the polypropylene resin film of Material Composition Example 9 were used. They were laminated in an order of (unidirectional prepreg 0°/unidirectional prepreg 90°/polypropylene resin film/carbon fiber mat/polypropylene resin film/unidirectional prepreg 90°/unidirectional prepreg 0°/adhesive film).

This laminate was sandwiched between release films and further sandwiched between tool plates. After placing the tool plate on the surface of a board of a press molding machine having a board surface temperature of 180° C., the board surface was closed and it was hot pressed at 3 MPa. After 5 minutes passed from the pressing, the board surface was opened, the tool plate was quickly placed on the surface of the board of the press molding machine having a board surface temperature of 40° C., and it was cooled and pressed at 3 MPa. After 5 minutes, the tool plate was taken out from the press molding machine to obtain a sandwich structure (board (A) 2) with the thermoplastic adhesive film having a plate thickness of 0.85 mm impregnated with polypropylene resin in the core layer. Next, a spacer having a thickness of 1.25 mm was inserted between the tool plates sandwiching the obtained sandwich structure with the thermoplastic adhesive film and, further, a spacer having a thickness of 0.4 mm was disposed only in the bonding region of the sandwich structure with the thermoplastic adhesive film, and hot press and cooling press were carried out again under the same procedure and conditions. By causing only the core layer in the central part of the sandwich structure with the thermoplastic adhesive film to spring back, a step-formed sandwich structure with the thermoplastic adhesive film, in which the outer periphery which was the adhesion region was adjusted to have a thickness of 0.85 mm, the other region was adjusted to have a thickness of 1.25 mm, was obtained. The inclination angle θ(°) of the skin layer 10 with respect to the in-plane direction of the sandwich structure (board (A) 2) with the thermoplastic adhesive film was 45°.

Next, the frame member (member (B) 3) having a rectangular frame shape made of the glass fiber reinforced nylon resin obtained in Example 1 and the CFRP plate with the thermoplastic adhesive film which was step-formed and processed into a size of 300 mm×200 mm were set in a mold for injection molding in the same manner as in Example 1, and after clamping the mold, the glass fiber reinforced nylon resin (bonding resin (C) 4) of Material Composition Example 5 was injection molded to manufacture an integrally molded body composed of a top board and a standing wall of four sides shown in FIG. 3. The cross section including the bonding section and the standing wall of the obtained integrally molded body is shown in FIGS. 11 and 12. In FIGS. 3, 11 and 12, the upper side of the figure is shown as the design surface side.

In the design surface of the integrally molded body, any of the bonding boundaries between the step-formed sandwich structure with the thermoplastic adhesive film (board (A) 2) and the bonding resin (C) 4 and between the bonding resin (C) 4 and the frame member (member (B) 3) of the integrally molded body had a good smoothness. Further, the warping amount of the integrally molded body was small and good.

Example 6

After only the surface of the adhesion surface side of the aluminum plate (board (A) 2) of Material Composition Example 11 was roughened with a sandpaper, it was adjusted to a size of 300 mm×200 mm. Next, the frame member (member (B) 3) having a rectangular frame shape made of the glass fiber reinforced nylon resin obtained in Example 1 and the aluminum plate (board (A) 2) were set in a mold for injection molding in the same manner as in Example 1, and after the mold was closed, the glass fiber reinforced nylon resin (bonding resin (C) 4) of Material Composition Example 5 was injection molded to manufacture an integrally molded body composed of the top plate and the standing wall of four sides shown in FIG. 3. The cross section including the bonding section and the standing wall of the obtained integrally molded body is shown in FIGS. 4 and 5. In FIGS. 3, 4 and 5, the upper side of the figure is shown as the design surface side.

In the design surface of the integrally molded body, any of the bonding boundaries between the aluminum plate (board (A) 2) and the bonding resin (C) 4 and between the bonding resin (C) 4 and the frame member (member (B) 3) had a good smoothness. Further, the warping amount of the integrally molded body was small and good.

Example 7

The CFRP board (board (A) 2) with the thermoplastic adhesive film (thermoplastic resin layer (D)) having a size of 300 mm×200 mm and a thickness of 1.25 mm obtained in Example 1 and the aluminum frame (member (B) 3) of Material Composition Example 13 were used. The surface of the bonding region of the aluminum frame was roughened with a sandpaper. Next, the CFRP plate with the thermoplastic adhesive film and four aluminum frames were set in a mold for injection molding in the same manner as in Example 2, and after closing the mold, the glass fiber reinforced nylon resin (bonding resin (C) 4) of Material Composition Example 5 was injection molded to manufacture an integrally molded body composed of the top plate and the standing wall of four sides shown in FIG. 15. The cross section including the bonding section and the standing wall of the obtained integrally molded body is shown in FIG. 16. In FIGS. 15 and 16, the upper side of the figure is shown as the design surface side.

In the design surface of the integrally molded body, any of the bonding boundaries between the CFRP plate (board (A) 2) with the adhesive layer and the bonding resin (C) 4 and between the bonding resin (C) 4 and the aluminum frame (member (B) 3) of the integrally molded body had a good smoothness. Further, the warping amount of the integrally molded body was small and good.

Example 8

Figure 18:
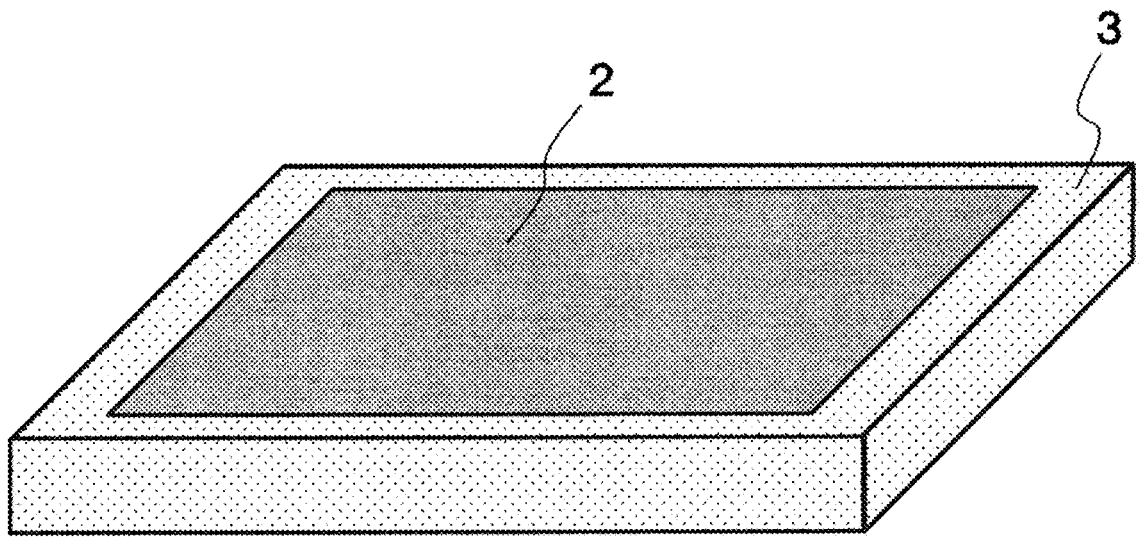
FIG. 18 is a schematic perspective view showing an example of another configuration of an integrally molded body.
Figure 19:
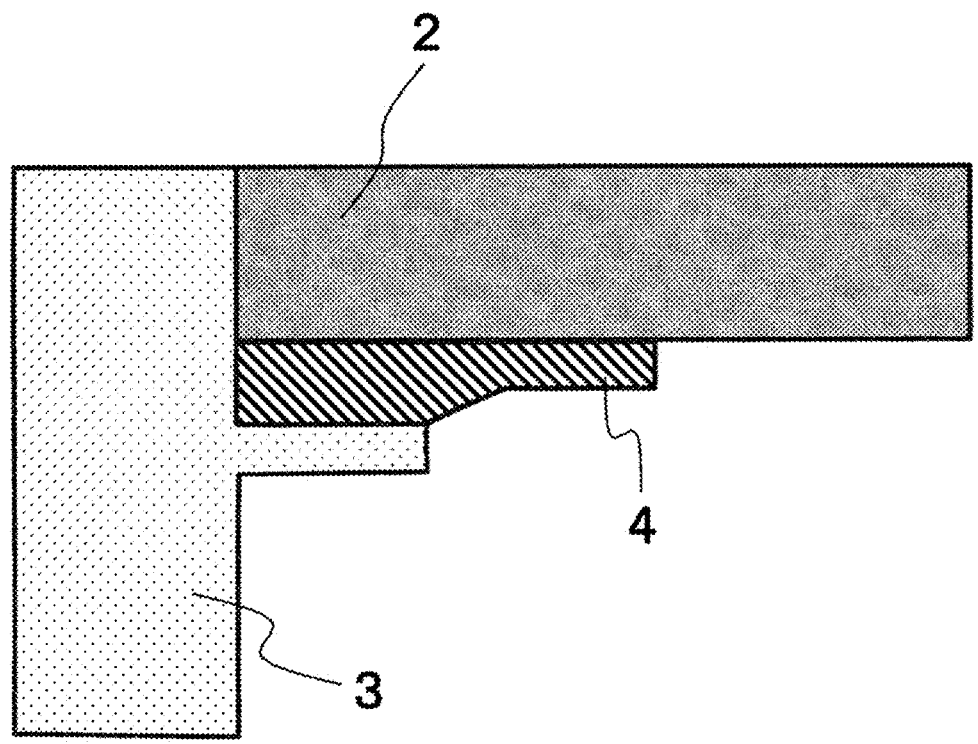
FIG. 19 is an enlarged sectional view in the thickness direction of an example of another configuration of an integrally molded body.

The CFRP board (board (A) 2) with the thermoplastic adhesive film having a size of 301 mm×201 mm and a thickness of 1.25 mm obtained in Example 1 and the frame member (member (B) 3) having a rectangular frame shape made of the glass fiber reinforced nylon resin obtained in Example 1 were set in a mold for injection molding in the same manner as in Example 1, and after the mold was closed, the glass fiber reinforced nylon resin (bonding resin (C) 4) of Material Composition Example 5 was injection molded to manufacture an integrally molded body composed of the top plate and the standing wall of four sides shown in FIG. 18. The cross section including the bonding section and the standing wall of the obtained integrally molded body is shown in FIG. 19. In FIGS. 18 and 19, the lower side of the figure is shown as the design surface side.

In the design surface of the integrally molded body, any of the bonding boundaries between the CFRP board (board (A) 2) with the thermoplastic adhesive film and the bonding resin (C) 4 and between the bonding resin (C) 4 and the frame member (member (B) 3) of the integrally molded body had a good smoothness. Further, the warping amount of the integrally molded body was small and good.

Comparative Example 1

Using the unidirectional prepreg obtained in Material Composition Example 3, after it was adjusted to a size of 400 mm square, a plurality of them were laminated in an order of (unidirectional prepreg 0°/unidirectional prepreg 90°/unidirectional prepreg 0°/unidirectional prepreg 90°/unidirectional prepreg 90°/unidirectional prepreg 0°//unidirectional prepreg 90°/unidirectional prepreg)0°. This laminate was sandwiched with release films and further sandwiched between tool plates. As a thickness adjustment, a spacer having a thickness of 1.2 mm was inserted between the tool plates. After placing a tool plate on a board surface with a board surface temperature of 150° C., the board surface was closed and heated and pressed at 3 MPa. After 5 minutes passed from the pressing, the board surface was opened to obtain a CFRP plate (board (A) 2) having a flat plate shape with a thickness of 1.2 mm.

Figure 20:
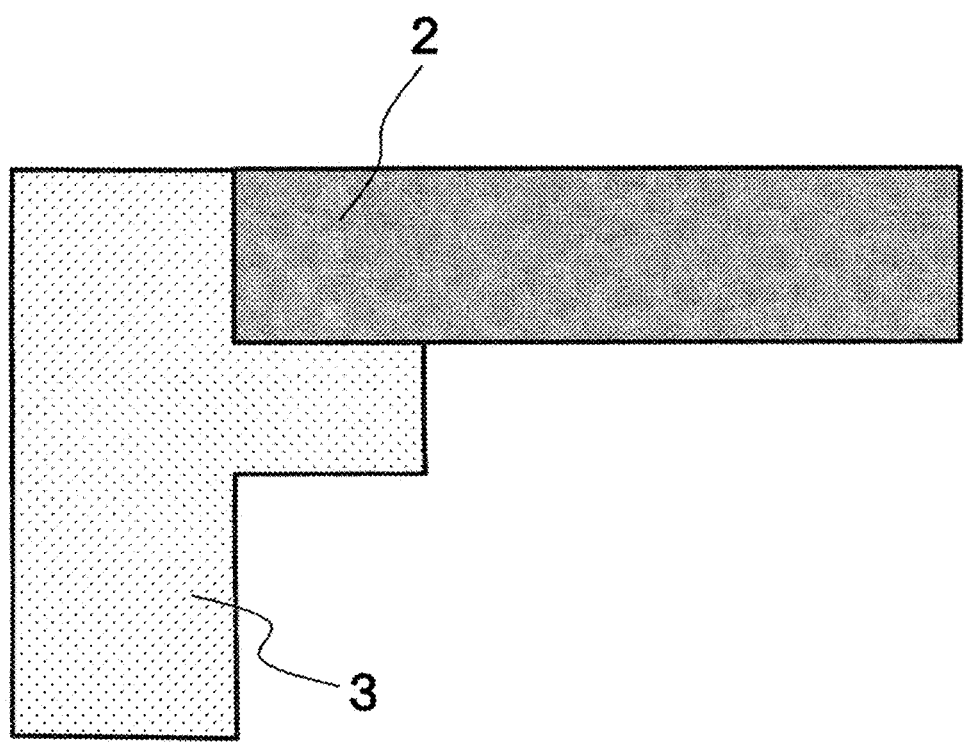
FIG. 20 is a schematic sectional view of a bonding section of an integrally molded body according to the prior art.

Next, an adhesive was applied only to the adhesion region of the CFRP plate (board (A) 2) processed into a size of 301 mm×201 mm. The CFRP plate (board (A) 2) coated with the adhesive was set in a mold for injection molding, and after closing the mold, the glass fiber reinforced nylon resin of Material Composition Example 5 was injection molded to manufacture an integrally molded body composed of the top plate and the standing wall of the four sides shown in FIG. 18. The cross section including the bonding section and the standing wall of the obtained integrally molded body is shown in FIG. 20. In FIGS. 18 and 20, the upper side of the figure is shown as the design surface side.

In the design surface of the integrally molded body, the bonding boundary between the CFRP plate (board (A) 2) with the adhesive layer and the injected resin of the integrally molded body had a good smoothness. However, the warping amount of the integrally molded body was large and not good. The properties of the integrally molded body are summarized in Table 1.

TABLE 1

| | | | Example 1 | Example 2 | Example 3 | Example 4 | Example 5 |
|---|---|---|---|---|---|---|---|
| Constituent member | Board (A) | — | CFRP board with thermoplastic adhesive film | CFRP board with thermoplastic adhesive film | Sandwich structure with foamed core layer | Sandwich structure with polypropylene resin core layer | Sandwich structure with thermoplastic adhesive film formed in stepped shape |
| | Member (B) | — | Glass fiber reinforced nylon resin | CFRP frame | Glass fiber reinforced nylon resin | Glass fiber reinforced nylon resin | Glass fiber reinforced nylon resin |
| | Bonding resin (C) | — | Glass fiber reinforced nylon resin | Glass fiber reinforced nylon resin | Glass fiber reinforced nylon resin | Glass fiber reinforced nylon resin | Glass fiber reinforced nylon resin |
| | Shape of member (B) | — | Fig. 2 (square frame) | Fig. 14 (independent four sides) | Fig. 2 (square frame) | Fig. 2 (square frame) | Fig. 2 (square frame) |
| Integrally molded body | Method of integration | — | Injection molding | Injection molding | Injection molding | Injection molding | Injection molding |
| | Shape of bonding section | — | Fig. 16 | Fig. 17 | Fig. 9 | Fig. 8 | Fig. 11 |
| | Positional relationship between board (A) and member (B) | — | Apart | Apart | Apart | Apart | Apart |
| | Amount of warping — Long side | mm | 1.0 | 0.7 | 1.1 | 1.0 | 1.1 |
| | Amount of warping — Short side | mm | 0.5 | 0.4 | 0.5 | 0.6 | 0.6 |
| | Amount of warping — Diagonal | mm | 0.6 | 0.4 | 0.7 | 0.6 | 0.7 |
| | Sum of respective warping amounts | mm | 2.1 | 1.5 | 2.3 | 2.2 | 2.4 |
| | Comprehensive evaluation | — | A | A | A | A | A |
| Smoothness of bonding boundary | Board (A) and bonding resin (C) | — | A | A | A | A | A |
| | Board (A) and member (B) | — | — | — | — | — | — |
| | Member (B) and bonding resin (C) | — | A | A | A | A | A |
| | Comprehensive evaluation | — | A | A | A | A | A |
| Comprehensive evaluation | | — | A | A | A | A | A |

| | | | Example 6 | Example 7 | Example 8 | Comparative Example 1 |
|---|---|---|---|---|---|---|
| Constituent member | Board (A) | — | Aluminum board | CFRP board with | CFRP board with | CFRP board |

TABLE 1-continued

| | | | | thermoplastic adhesive film | thermoplastic adhesive film | |
|---|---|---|---|---|---|---|
| | Member (B) | | — | Glass fiber reinforced nylon resin | Aluminum frame | Glass fiber reinforced nylon resin | — |
| | Bonding resin (C) | | — | Glass fiber reinforced nylon resin | Glass fiber reinforced nylon resin | Glass fiber reinforced nylon resin | Glass fiber reinforced nylon resin |
| | Shape of member (B) | | — | Fig. 2 (square frame) | Fig. 14 (independent four sides) | Fig. 2 (square frame) | — |
| Integrally molded body | Method of integration | | — | Injection molding | Injection molding | Injection molding | Injection molding |
| | Shape of bonding section | | — | Fig. 4 | Fig. 16 | Fig. 19 | Fig. 20 |
| | Positional relationship between board (A) and member (B) | | — | Apart | Apart | Partially present with contact portion | — |
| | Amount of warping | Long side | mm | 1.2 | 1.2 | 0.9 | 1.6 |
| | | Short side | mm | 0.7 | 0.7 | 0.5 | 0.8 |
| | | Diagonal | mm | 0.7 | 0.8 | 0.6 | 1.2 |
| | | Sum of respective warping amounts | mm | 2.6 | 2.7 | 2.0 | 3.6 |
| | | Comprehensive evaluation | | — | B | B | A | D |
| | Smoothness of bonding boundary | Board (A) and bonding resin (C) | | — | A | A | A | A |
| | | Board (A) and member (B) | | — | — | — | B | — |
| | | Member (B) and bonding resin (C) | | — | A | A | A | — |
| | | Comprehensive evaluation | | — | A | A | B | A |
| Comprehensive evaluation | | | — | B | B | B | D |

INDUSTRIAL APPLICABILITY

The integrally molded body can be effectively used for interior/exterior materials of automobiles, casings of electric/electronic equipment, structural materials for bicycles and sporting goods, interior materials of aircraft, boxes for transportation and the like.

The invention claimed is:

1. An integrally molded body comprising:
a board (A),
a member (B), and
an injection molded bonding resin (C) interposed between the board (A) whose one surface is a design surface and the member (B),
wherein, inside the member (B), a first bonding section is disposed to space apart the board (A) and the member (B) and by which at least a partial region of an outer peripheral edge section of the board (A) bonds to the injection molded bonding resin (C), and
at least a part of the design surface-side surface of the integrally molded body has a region where the board (A), the member (B), and the injection molded bonding resin (C) are exposed, wherein 1) the board (A) has a member composed of at least one of a fiber reinforced resin member comprising reinforcing fibers and a thermosetting resin and a metal member, and 2) the board (A) has a sandwich structure sandwiching both surfaces of a core layer with skin layers each of which includes the member composed of at least one of a fiber reinforced resin member comprising reinforcing fibers and a thermosetting resin and a metal member, and the core layer is selected from a thermoplastic resin, a foam, and a porous base material comprising discontinuous fibers and a thermoplastic resin,
wherein a thermoplastic resin layer (D) is further provided on an outer surface of the board (A), and the board (A) and the injection molded bonding resin (C) are bonded via the thermoplastic resin layer (D).

2. The integrally molded body according to claim 1, wherein the first bonding section is formed over an entire circumference of an outer peripheral edge section of the board (A).

3. The integrally molded body according to claim 1, wherein the board (A) and the member (B) include a region overlapping via the injection molded bonding resin (C).

4. The integrally molded body according to claim 1, wherein the injection molded bonding resin (C) is a thermoplastic resin.

5. The integrally molded body according to claim 1, wherein the member (B) is a metal frame.

6. The integrally molded body according to claim 1, wherein the member (B) is a fiber reinforced resin comprising reinforcing fibers and a resin.

7. The integrally molded body according to claim 1, wherein the member (B) is a frame member having a standing wall shape portion in at least a part of the member (B).

8. The integrally molded body according to claim 1, wherein a fitting portion, into which the injection molded bonding resin (C) enters, is provided in a part of the core layer composed of either the foam or the porous base material comprising discontinuous fibers and a thermoplastic resin.

9. The integrally molded body according to claim 1, wherein a stepped portion is provided between the first bonding section and a region other than the first bonding section of the board (A) whose core layer is the porous base material, and the stepped portion has an inclined surface of 10° to 90° with respect to the in-plane direction of the board (A).

10. The integrally molded body according to claim 9, wherein the porosity of the porous base material in the first bonding section is lower than the porosity of the porous base material in the region other than the first bonding section.

11. A method of producing the integrally molded body accordingly to claim 1 comprising at least steps [1] and [2]:
 [1] placing a board (A), whose one surface is a design surface, inside a member (B) having a frame shape, at a condition where at least a part of the board (A) is apart from the member (B), and
 [2] bonding and integrating the board (A) and the member (B) with each other at least at an outer peripheral edge section of the board (A) by injection molding a bonding resin (C) into a space between the board (A) and the member (B).

12. The method according to claim 11, wherein at least a part of the surface of the integrally molded body on the design surface side is formed as a region where the board (A), the member (B), and the bonding resin (C) are exposed, by injection molding the bonding resin (C) into the space from an opposite side of the design surface.

13. An integrally molded body comprising:
 a board (A),
 a member (B), and
 an injection molded bonding resin (C) interposed between the board (A) whose one surface is a design surface and the member (B),
 wherein, inside the member (B), a first bonding section is disposed to space apart the board (A) and the member (B) and by which at least a partial region of an outer peripheral edge section of the board (A) bonds to the injection molded bonding resin (C),
 at least a part of the design surface-side surface of the integrally molded body has a region where the board (A), the member (B), and the injection molded bonding resin (C) are exposed, wherein 1) the board (A) has a member composed of at least one of a fiber reinforced resin member comprising reinforcing fibers and a thermosetting resin and a metal member, and 2) the board (A) has a sandwich structure sandwiching both surfaces of a core layer with skin layers each of which includes the member composed of at least one of a fiber reinforced resin member comprising reinforcing fibers and a thermosetting resin and a metal member, and the core layer is selected from a thermoplastic resin, a foam, and a porous base material comprising discontinuous fibers and a thermoplastic resin, the board (A) and the member (B) include a region overlapping via the injection molded bonding resin (C), and
 the overlapping region is formed by disposing the member (B) to overlap in parallel under the board (A) via the bonding resin (C),
 wherein a thermoplastic resin layer (D) is further provided on an outer surface of the board (A), and the board (A) and the injection molded bonding resin (C) are bonded via the thermoplastic resin layer (D).

* * * * *